US009442183B2

(12) United States Patent
Asanuma

(10) Patent No.: US 9,442,183 B2
(45) Date of Patent: Sep. 13, 2016

(54) RADAR APPARATUS AND SIGNAL PROCESSING METHOD

(71) Applicant: FUJITSU TEN LIMITED, Kobe, Hyogo (JP)

(72) Inventor: Hisateru Asanuma, Kobe (JP)

(73) Assignee: FUJITSU TEN LIMITED, Kobe-shi (JP)

(*) Notice: Subject to any disclaimer, the term of this patent is extended or adjusted under 35 U.S.C. 154(b) by 216 days.

(21) Appl. No.: 14/149,101

(22) Filed: Jan. 7, 2014

(65) Prior Publication Data

US 2014/0292558 A1 Oct. 2, 2014

(30) Foreign Application Priority Data

Mar. 29, 2013 (JP) .................................. 2013-073556

(51) Int. Cl.
| | |
|---|---|
| *G01S 13/34* | (2006.01) |
| *G01S 7/35* | (2006.01) |
| *G01S 13/93* | (2006.01) |
| *G01S 13/536* | (2006.01) |
| G01S 13/00 | (2006.01) |
| G01S 7/41 | (2006.01) |

(52) U.S. Cl.
CPC .............. *G01S 7/354* (2013.01); *G01S 13/345* (2013.01); *G01S 13/536* (2013.01); *G01S 13/931* (2013.01); *G01S 7/41* (2013.01)

(58) Field of Classification Search
CPC .............. G01S 7/02; G01S 7/41; G01S 7/35; G01S 7/352; G01S 7/354; G01S 2007/356; G01S 13/02; G01S 13/06; G01S 13/08; G01S 13/32; G01S 13/34; G01S 13/345; G01S 13/50; G01S 13/52; G01S 13/536; G01S 13/88; G01S 13/93; G01S 13/931

USPC ........ 342/27, 28, 70-72, 118, 128-133, 175, 342/192-197
See application file for complete search history.

(56) References Cited

U.S. PATENT DOCUMENTS

| | | | | | |
|---|---|---|---|---|---|
| 6,072,422 | A | * | 6/2000 | Yamada | .................. G01S 7/354 342/133 |
| 6,121,917 | A | * | 9/2000 | Yamada | ................ G01S 13/345 342/195 |
| 6,140,954 | A | * | 10/2000 | Sugawara | ............. G01S 13/345 342/195 |
| 6,661,370 | B2 | * | 12/2003 | Kishida | ................. G01S 13/345 342/175 |
| 6,674,393 | B2 | * | 1/2004 | Kishida | ................... G01S 7/352 342/70 |

(Continued)

FOREIGN PATENT DOCUMENTS

| | | |
|---|---|---|
| JP | A-2004-226120 | 8/2004 |
| JP | A-2010-2265 | 1/2010 |

*Primary Examiner* — Bernarr Gregory
(74) *Attorney, Agent, or Firm* — Oliff PLC

(57) ABSTRACT

There is provided a radar apparatus capable of extracting a peak signal obtained from a difference frequency between a transmitting signal and a receiving signal during first and second periods and deriving target information based on the extracted peak signals. A predicting unit derives a predicted peak signal obtained by predicting a current peak signal based on the peak signal obtained in a previous process. An extracting unit extracts a peak signal included within a predetermined frequency range, with the predicted peak signal being as a base point, in each of the first and second periods. A pairing unit pairs the peak signals extracted in the first and second periods. The pairing unit changes a pairing method according to the number of the peak signals extracted in each of the first and second periods.

7 Claims, 15 Drawing Sheets

(56) References Cited

U.S. PATENT DOCUMENTS

| | | | |
|---|---|---|---|
| 6,731,235 B2 * | 5/2004 | Kishida | G01S 13/345 342/195 |
| 6,753,805 B2 * | 6/2004 | Nakanishi | G01S 7/35 342/192 |
| 6,765,523 B2 * | 7/2004 | Ono | G01S 13/931 342/195 |
| 6,856,278 B2 * | 2/2005 | Nakanishi | G01S 13/345 342/128 |
| 8,638,254 B2 * | 1/2014 | Itoh | G01S 13/345 342/128 |

\* cited by examiner

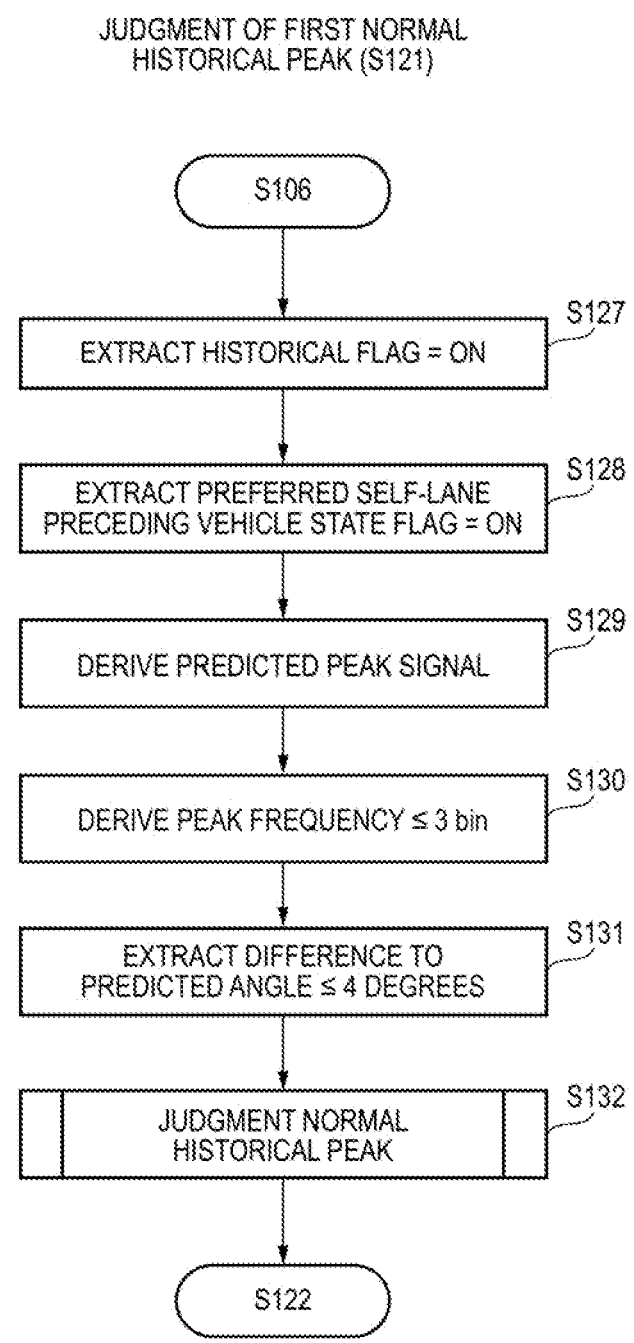

RADAR APPARATUS AND SIGNAL PROCESSING METHOD

CROSS-REFERENCE TO RELATED APPLICATIONS

This application is based on and claims priority from Japanese Patent Application No. 2013-073556 filed on Mar. 29, 2013.

TECHNICAL FIELD

The present invention relates to signal processing for derivation of a target.

BACKGROUND

In the past, a vehicle-mounted radar apparatus derives a position of a target with respect to a vehicle (radar apparatus) by transmitting a transmission wave from a transmitter antenna and receiving a reflection wave from the target by a receiver antenna. The detailed process thereof is as follows. A signal processing unit of the radar apparatus generates a beat signal by mixing a transmitting signal corresponding to the transmission wave of which a frequency is changed in a given period, and a receiving signal corresponding to the reflection wave. That is, the signal processing unit generates the beat signal based on a frequency difference (beat frequency) between the transmitting signal and the receiving signal in each period including an up period in which the frequency ascends in a predetermined period, and a down period in which the frequency descends in a predetermined period.

Then, the signal processing unit generates a signal (transformed signal) for every frequency by processing the beat signal through FFT (Fast Fourier Transform). Among the transformed signals, a signal exceeding a threshold of a predetermined signal level is extracted as a peak signal. The signal processing unit derives paired data by pairing the peak signal of the up period and the peak signal of the down period based on a given condition.

For example, the signal processing unit derives paired data (predicted paired data) predicting the current paired data based on the paired data which is derived in the past, and derives a peak signal (predicted peak signal) predicting the current peak signal. And, the signal processing unit extracts a peak signal (predicted peak signal) predicting the current peak signal from the predicted paired data. And, the signal processing unit extracts the current peak signal included in a predetermined range, with a frequency of the predicted peak signal being as a base point, as a current peak signal corresponding to the predicted peak signal, for every up period and down period. The signal processing unit derives paired data by pairing the peak signal of each corresponding period from the frequency of the extracted peak signal and the angular information.

The signal processing unit derives a distance (vertical distance) from the vehicle to the target, or a distance (horizontal distance) of the target with respect to a vehicle running in a direction substantially perpendicular to a traveling direction of the vehicle. Further, the signal processing unit derives a relative speed of the target with respect to the vehicle. The signal processing unit outputs determined information about the target, including the position of the target and the relative speed of the target, to a vehicle control device, so that the vehicle control device performs necessary vehicle control according to the target information. In this instance, the technology associated with the present invention is disclosed in Patent Documents 1 and 2, for example.

Patent Document 1: Japanese Patent Application Publication No. 2010-002265A

Patent Document 2: Japanese Patent Application Publication No. 2004-226120A

However, even for the reflection wave received from one target, a plurality of peak signals having different frequencies may appear within the predetermined range depending upon a material of the target. In the case where the plurality of peak signals having different frequencies appear, the pairing is conventionally performed by extracting the peak signal of a frequency closest to the frequency of the predicted peak signal. If the pairing is performed by this method, for example, two peak signals appear in the up period and the down period, respectively. Normally, even though the peak signals of the low frequency should be paired, in a case where the frequency of the peak signal of the high frequency approximates to the frequency of the predicted peak signal in the up period, and the frequency of the peak signal of the low frequency approximates to the frequency of the predicted peak signal in the down period, the peak signal of the high frequency in the up period and the peak signal of the low frequency in the down period may be paired.

Specifically, the reflection wave from the preceding vehicle includes a reflection wave from a bottom surface of the preceding vehicle near its center portion, in addition to the reflection wave from a rear portion of the preceding vehicle. If the rear portion of the preceding vehicle is made of metal or the like, power of the peak signal is strong since an intensity of the reflection wave from the rear portion is sufficiently high. Also, since the reflection wave from the bottom surface is not detected, or power of the peak signal is sufficiently weak even though it is detected, the possibility that mis-pairing occurs is low. However, if the rear portion of the preceding vehicle is made of resin or the like, the power of the peak signal is not high since the intensity of the reflection wave from the rear portion is not strong, so that the power may be equal to the power of the peak signal of the reflection wave from the bottom surface. In this instance, two peak signals appear, and if a method of pairing the peak signals approximating to the frequency of the predicted peak signal is used, the signals may be paired by which the one employs the peak signal of the rear portion, and the other employs the peak signal of the bottom surface.

In this way, in consequence of the mis-pairing when the paired data is derived, a variation in relative speed or the like occurs, thereby performing the vehicle control in a wrong way.

SUMMARY

It is therefore an object of the present invention to provide a technology of avoiding a vehicle being controlled in a wrong way even in a case where a current peak signal corresponding to a predicted peak signal is extracted in plural.

(1) According to an aspect of the embodiments of the present invention, there is provided a radar apparatus capable of extracting a peak signal obtained from a difference frequency between a transmitting signal of which a frequency is changed in a predetermined period, and a receiving signal obtained by receiving a reflection wave of a transmission wave based on the transmitting signal at a target, during a first period in which the frequency of the transmitting signal ascends, and a second period in which the frequency of the transmitting signal descends, and deriving information about the target based on the extracted peak signals, the radar apparatus comprising: a predicting unit configured to derive a predicted peak signal obtained by predicting a current peak signal based on the peak signal obtained in a previous process; an extracting unit configured to extract a peak signal included within a predetermined frequency range, with the predicted peak signal being as a base point, in each of the first period and the second period; and a pairing unit configured to pair the peak signal extracted in the first period and the peak signal extracted in the second period, wherein the pairing unit changes a pairing method according to the number of the peak signals extracted in each of the first period and the second period.

(2) The radar apparatus according to (1), wherein the pairing unit changes the peak signals to be paired according to the number of the peak signals extracted in each of the first and second periods.

(3) The radar apparatus according to (1) or (2), wherein if both the number of the peak signals extracted in the first period and the number of the peak signals extracted in the second period are plural, the pairing unit pairs the peak signals having the lowest frequency among the peak signals extracted in each of the first and second periods.

(4) The radar apparatus according to any one of (1) to (3), wherein if the number of the peak signals extracted in one of the first and second periods is plural and the number of the peak signals extracted in the other of the first and second periods is 1, the pairing unit pairs the peak signal having the lowest frequency among the peak signals extracted in the one of the first and second periods and the peak signal predicted in the other of the first and second periods.

(5) The radar apparatus according to any one of (1) to (4), wherein if both the number of the peak signals extracted in the first period and the number of peak signals extracted in the second period are 1, the pairing unit pairs the peak signals extracted in the first and second periods.

(6) The radar apparatus according to any one of (1) to (5), wherein if a distance to the target is above a predetermined distance, the pairing unit executes a process of changing the pairing method.

(7) According to another aspect of the embodiments of the present invention, there is provided a signal processing method capable of extracting a peak signal obtained from a difference frequency between a transmitting signal of which a frequency is changed in a predetermined period, and a receiving signal obtained by receiving a reflection wave of a transmission wave based on the transmitting signal at a target, during a first period in which the frequency of the transmitting signal ascends, and a second period in which the frequency of the transmitting signal descends, and deriving information about the target based on the extracted peak signals, the signal processing method comprising: (a) deriving a peak signal predicting a current peak signal based on the peak signal obtained in a previous process; (b) extracting a peak signal included within a predetermined frequency range, with the predicted peak signal being as a base point, in each of the first period and the second period; and (c) pairing the peak signal extracted in the first period and the peak signal extracted in the second period, wherein, in the step (c), a pairing method is changed according to the number of the peak signals extracted in each of the first period and the second period.

According to the aspects of (1) to (7), since the pairing method is changed according to the number of the extracted peak signals, even if a plurality of peak signals are extracted, the optimum pairing can be performed, and thus it is possible to avoid the wrong vehicle control by preventing the mis-pairing.

According to the aspects of (2) to (5), even if the number of extracted peak signals is plural and the number is one, it is possible to perform the pairing by the optimum peak signal. In particular, according to the aspect of (6), it is possible to perform the further reliably pairing by excluding the range having the mis-pairing possibility from the process of the present invention.

BRIEF DESCRIPTION OF THE DRAWINGS

In the accompanying drawings:
FIG. 9 is a flowchart illustrating a first normal historical peak judging process.

DETAILED DESCRIPTION OF THE EMBODIMENTS

Hereinafter, an embodiment of the present invention will now be described with reference to the accompanying drawings.

1. Configuration

Figure 1:
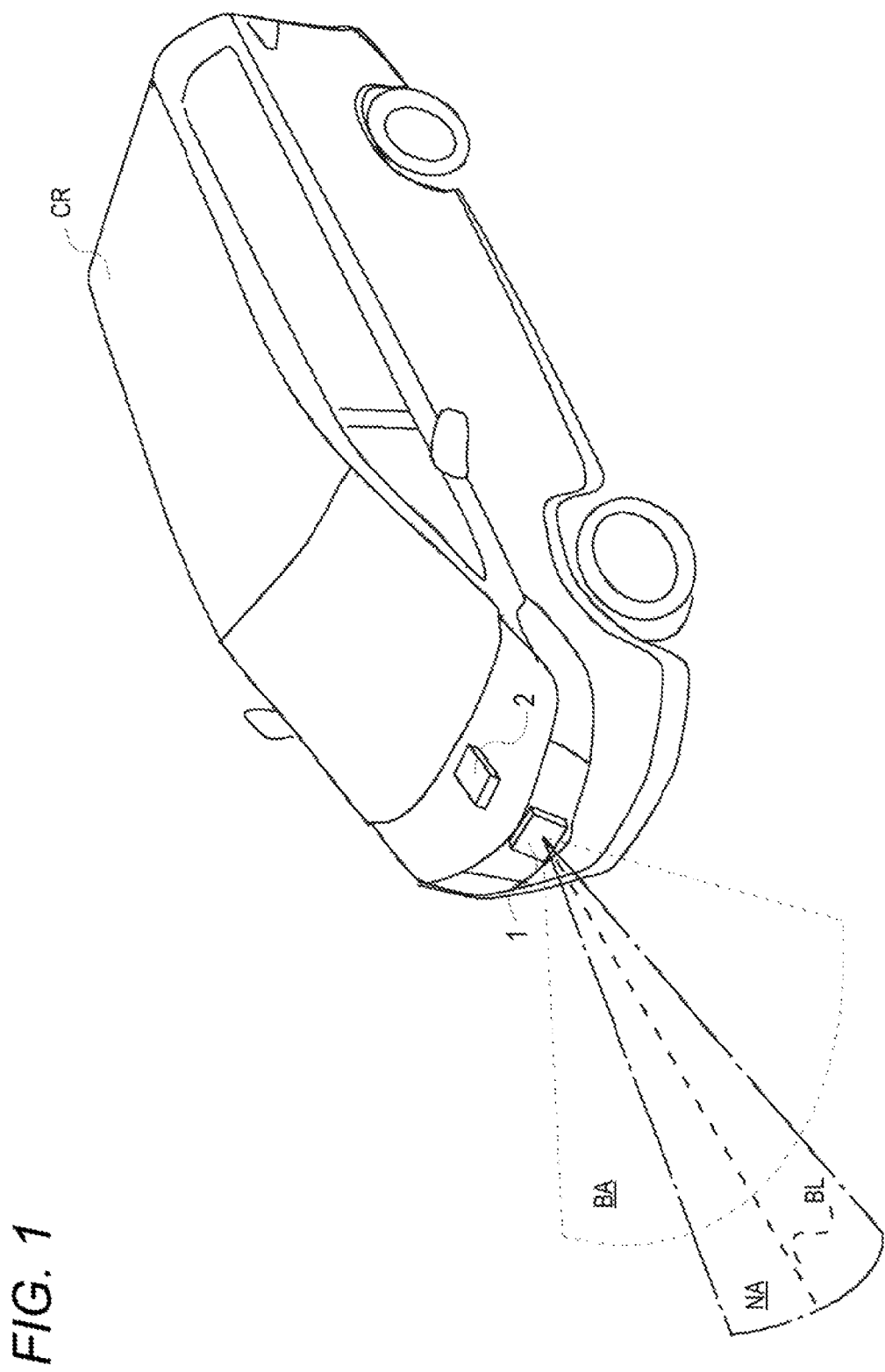
FIG. 1 is a diagram of an overall vehicle.

FIG. 1 is a view of an overall vehicle CR. The vehicle CR usually includes a radar apparatus 1 and a vehicle control device 2 which are provided in a vehicle control system 10 according to this embodiment. The radar apparatus 1 is installed at a front portion of the vehicle CR. The radar apparatus 1 scans a given scanning scope through once scanning to derive a distance corresponding to a traveling direction of the vehicle CR between the vehicle CR and a target, that is, a distance (vertical distance) when a reflection wave from the target arrives at the reception antenna of the radar apparatus 1. Also, the radar apparatus 1 derives a distance corresponding to a horizontal direction (vehicular width direction) of the vehicle CR between the vehicle CR and the target, that is, a distance (horizontal distance) of the target with respect to the vehicle CR in a direction substantially perpendicular to a reference axis BL which imaginarily extends in the traveling direction of the vehicle CR. In this instance, the horizontal distance is derived by performing a trigonometric operation function based on information about an angle of the target with respect to the vehicle CR. In this way, the radar apparatus 1 derives information about the position of the target with respect to the vehicle CR. Further, the radar apparatus 1 derives a relative speed which is a speed of the target with respect to the speed of the vehicle CR.

In this instance. FIG. 1 shows a beam pattern of a transmission wave transmitted from two transmission antennas (transmission antenna 13a and transmission antenna 13b illustrated in FIG. 2) of the radar apparatus which will be described later. Supposing that the reference axis BL is an angle ±0 degree, a beam pattern NA of the transmission wave outputted from the transmission antenna 13a has a narrow angular range (e.g., ±6 degrees) in comparison to a beam pattern BA of the transmission wave outputted from the transmission antenna 13b, and is output as a relatively sharp beam pattern having a long vertical distance. The reason of the long vertical distance is that an output level outputting the transmission wave is relatively high.

Contrary to this, the beam pattern BA of the transmission wave outputted from the transmission antenna 13b has a wide angular range (e.g., ±10 degrees) in comparison to the beam pattern NA of the transmission wave outputted from the transmission antenna 13a, and is output as a relatively broad beam pattern having a short vertical distance. The reason of the short vertical distance is that the output level outputting the transmission wave is relatively low. By outputting a transmission wave of a different beam pattern at each a transmission period of a transmission period in which the transmission antenna 13a outputs the transmission wave, and a transmission period in which the transmission antenna 13b outputs the transmission wave, it is possible to prevent an error in each derivation due to phase aliasing of the reflection wave from the target. The process of deriving the angle of the target will be described later.

A mount position of the radar apparatus 1 in FIG. 1 is near the front bumper of the vehicle, but it is not limited to the vicinity of the front bumper of the vehicle. As long as the position derives the target according to a purpose of controlling the vehicle CR by the vehicle control device 2 which will be described later, other mount position, such as a rear front portion of the vehicle CR or a side mirror of a lateral portion of the vehicle CR, is possible.

The vehicle CR includes the vehicle control device 2 in the vehicle CR. The vehicle control device 2 is an ECU (Electronic Control Unit) for controlling each device of the vehicle CR.

Figure 2:
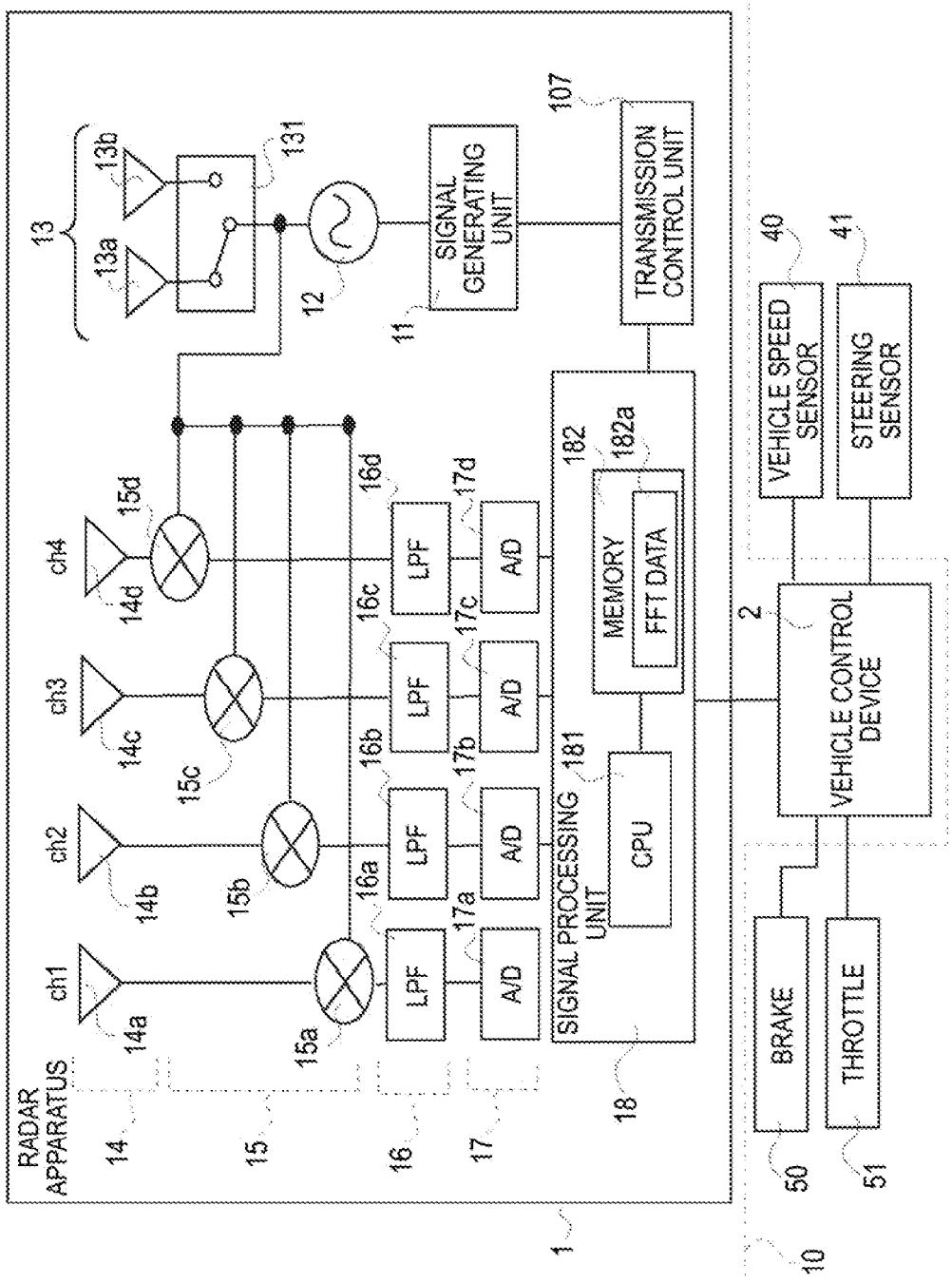
FIG. 2 is a block diagram of a vehicle control system.

FIG. 2 is a block diagram of the vehicle control system 10. The vehicle control system 10 is configured so that the radar apparatus 1 and the vehicle control device 2 are electrically connected to each other, and the target information on the position and the relative speed of the target which are usually derived from the radar apparatus is output to the vehicle control device 2. That is, the radar apparatus 1 outputs the target information including the vertical distance, the horizontal distance, and the relative speed of the target with respect to the vehicle CR to the vehicle control device 2. The vehicle control device 2 controls operation of various devices of the vehicle CR based on the target information. In addition, the vehicle control device 2 of the vehicle control system 10 is electrically connected to various sensors provided in the vehicle CR, such as a vehicle speed sensor 40 and a steering sensor 41. Further, the vehicle control device 2 is electrically connected to various devices provided in the vehicle CR, such as a brake 50 and a throttle 51.

The radar apparatus 1 generally includes a signal generating unit 11, an oscillator 12, a transmission antenna 13, a reception antenna 14, a mixer 15, an LPF (Low Pass Filter) 16, an AD (Analog/Digital) converter 17, and a signal processing unit 18.

The signal generating unit 11 generates a modulation signal, for example, of which a voltage is changed in a triangular-wave shape based on a control signal of a transmission control unit 107 which will be described later.

The oscillator 12 is a voltage control oscillator for controlling an oscillation frequency with a voltage, and frequency-modulates a signal of a given frequency band (e.g., 76.5 GHz), based on the modulated signal generated from the signal generating unit 11, to output it to the transmission antenna 13 as a transmitting signal with a center frequency of 76.5 GHz.

The transmission antenna 13 outputs a transmission wave relating to the transmitting signal to the outside of the vehicle. The radar apparatus 1 according to this embodiment includes two transmission antennas, that is, a transmission antenna 13a and a transmission antenna 13b. The transmission antennas 13a and 13b are switched in a predetermined period by a switching of a conversion unit 131, and the transmission wave is continuously output to the outside of the vehicle from the transmission antenna 13 connected to the oscillator 12. The transmission antenna 13a and the transmission antenna 13b have a different arrangement (antenna pattern) of antenna elements. Therefore, the beam pattern of the transmission wave transmitted from the transmission antennas 13a and 13b is different from each other, as illustrated in FIG. 1.

The conversion unit 131 is a switch for converting a connection of the oscillator 12 and the transmission antenna 13, and connects the oscillator 12 and any one of the transmission antenna 13a and the transmission antenna 13b according to the signal of the transmission control unit 107.

The reception antenna 14 is a plurality of array antennas receiving a reflection wave coining from the target at which the transmission wave continuously transmitted from the transmission antenna 13 is reflected. In this embodiment, the reception antenna 14 includes four reception antennas, that is, reception antennas 14a(ch1), 14b(ch2), 14c(ch3) and 14d(ch4). Each antenna of the reception antennas 14a to 14d is arranged at a regular interval.

The mixer 15 is provided at each reception antenna. The mixer 15 mixes the receiving signal and the transmitting signal. A beat signal which is a difference between both signals, that is, the transmitting signal and the receiving signal, is generated by mixing the transmitting signal and the receiving signal, and is output to the LDF 16.

The transmitting signal and the receiving signal which generate the beat signal will now be described by taking a signal processing method of FM-CW (Frequency Modulated Continuous Wave) as an example with reference to FIG. 3. Although the FM-CW method will be described as an example in this embodiment, the present invention is not limited to this method, if the method derives the target by combining a plurality of periods, such as an up period in which the frequency of the transmitting signal ascends, and a down period in which the frequency of the transmitting signal descends.

Figure 3:
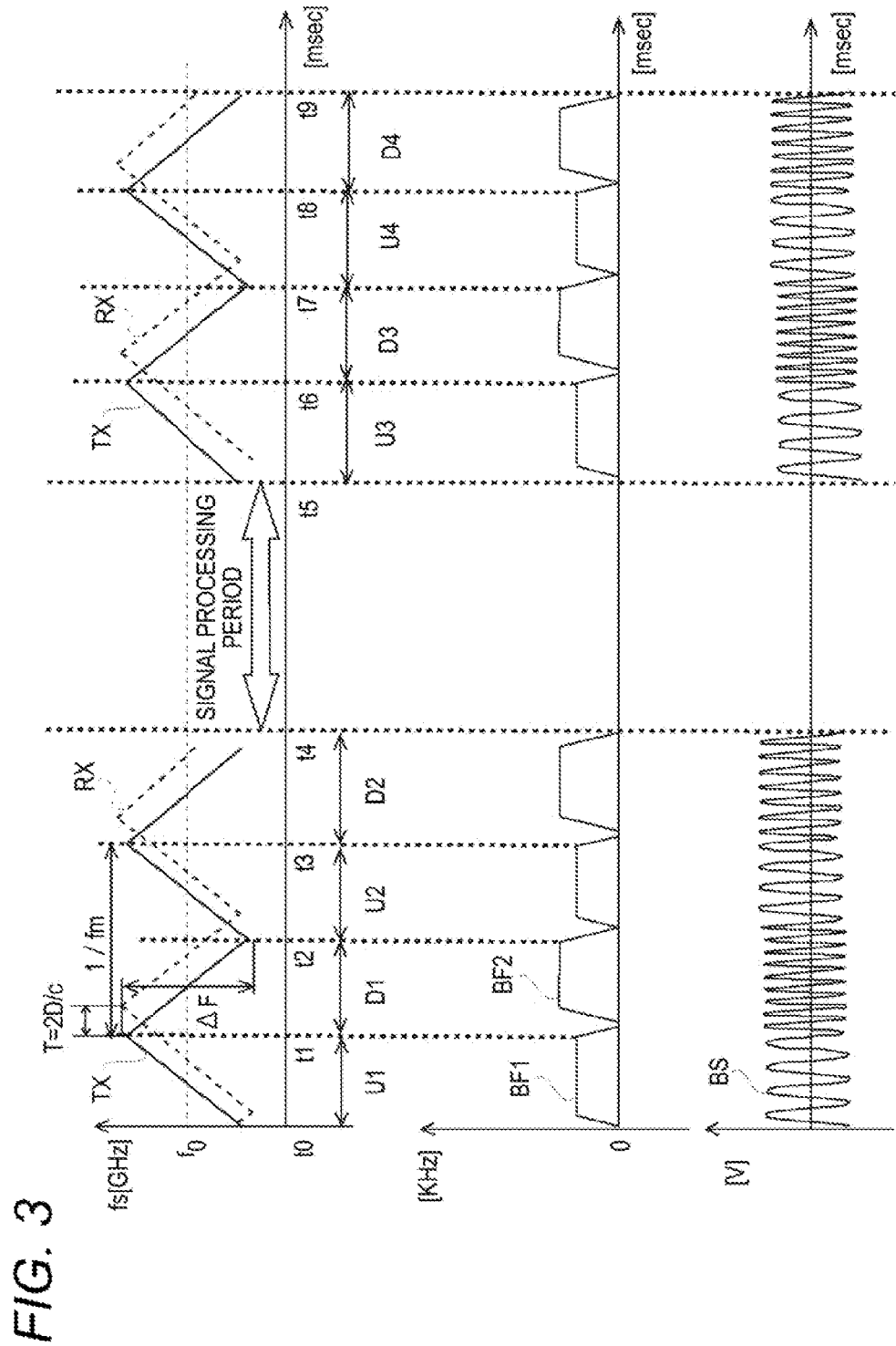
FIG. 3 is a diagram illustrating a signal of an FM-CW mode.

Symbols that appear in expressions described below and signals and beat frequencies of the FM-CW shown in FIG. 3 are as follows: fr: distance frequency, fd: speed frequency, fo: center frequency of a transmission wave, ΔF: frequency deviation width, fm: repetition frequency of a modulation wave, c: speed of light (speed of a wave), T: reciprocating time of a wave between the vehicle CR and the target, fs: transmission/reception frequency, R: vertical distance, V: relative speed, θm: angle of the target, θup: angle corresponding to a peak signal in the up period, and θdn: angle corresponding to a peak signal in the down period.

FIG. 3 is a diagram illustrating a signal of an FM-CW mode. An upper drawing in FIG. 3 shows a signal waveform of a transmitting signal TX of an FM-CW mode and a receiving signal RX of an FM-CW mode, in which a horizontal axis represents a time (msec). In the drawing, the transmitting signal TX repeats a constant change between 200 MHz, for example, it descends to a predetermined frequency (e.g., 76.6 GHz) and then ascends up to a predetermined frequency (e.g., 76.4 GHz), with a center frequency being f0. It has a period (referred to as an up period, and including, for example, periods U1, U2, U3 and U4 shown in FIG. 3) in which the frequency ascends up to a predetermined frequency and a period (referred to as a down period, and including, for example, periods D1, D2, D3 and D4) in which the frequency descends to a predetermined frequency after it ascended to the predetermined frequency. Further, if the transmission wave transmitted from the transmission antenna 13 is reflected from the object, and then is received by the reception antenna 14 as the reflection wave, the receiving signal RX is input to the mixer 15 via the reception antenna 14. In the same manner as the transmitting signal TX, the receiving signal RX also has an up period in which the frequency ascends up to a predetermined frequency, and a down period in which the frequency descends to a predetermined frequency.

The radar apparatus 1 of this embodiment transmits the transmission wave corresponding to two cycles of transmitting signal TX, in which a combination of one up period and one down period is one cycle of the transmitting signal TX, to the outside of the vehicle. For example, the transmission wave of a beam pattern NA is output from the transmission antenna 13a during the first cycle (period U1 of up period at transmitting periods t0 to t1 and period D1 of down period at transmitting periods t1 to t2). The transmission wave of a beam pattern BA is output from the transmission antenna 13b during the next second cycle (period U2 of up period at transmitting periods t2 to t3 and period D2 of down period at transmitting periods t3 to t4). The signal processing unit 18 performs a signal processing to derive the target information using the transmitting signal TX and the receiving signal RX (signal processing period of t4 to t5). After that, the transmission wave of the beam pattern NA is output from the transmission antenna 13a during the third cycle (period U3 of up period at transmitting periods t5 to t6 and period D3 of down period at transmitting periods t6 to t7), and the transmission wave of the beam pattern BA is output from the transmission antenna 13b during the fourth cycle (period U4 of up period at transmitting periods t7 to t8 and period D4 of down period at transmitting periods t8 to t9). After that, the signal processing unit 18 performs the signal processing to derive the target information. Subsequently, the same process is repeated.

In this instance, a temporal delay (time T) occurs in the receiving signal RX relative to the transmitting signal TX in accordance with the distance of the target with respect to the vehicle CR. In addition, if there is a speed difference between the speed of the vehicle CR and the speed of the target, a difference occurs between the transmitting signal TX and the receiving signal RX by Doppler shift.

The middle drawing in FIG. 3 shows a bit frequency generated by the difference between the transmitting signal TX and the receiving signal RX in the up period and the down period, in which a vertical axis represents a frequency (kHz), and a horizontal axis represents a time (msec). For example, a bit frequency BF1 is derived in the period U1, while a bit frequency BF2 is derived in the period D1. The bit frequency is derived in each period.

Tower drawing in FIG. 3 shows a bit signal corresponding to the bit frequency, in which a vertical axis represents an amplitude (V), and a horizontal axis represents a time (msec). In the drawing, a bit signal BS which is an analog signal corresponding to the bit frequency is shown, and after the bit signal BS is filtered by the LPF 16 which will be described later, it is converted into digital data by the AD converter 17. In this instance, although FIG. 3 shows the bit signal BS corresponding to the receiving signal RX in the case of receiving it from one reflective point, if the transmission wave corresponding to the transmitting signal TX is reflected from a plurality of reflective points and is received by the reception antenna 14 as a plurality of reflection waves, the receiving signal RX generates a signal according to the plurality of reflection waves. In this instance, the bit signal BS indicative of the difference between the transmitting signal TX and the receiving signal RX is synthesized by each difference between the plurality of receiving signals RX and the plurality of transmitting signals TX.

After the bit signal BS is converted into digital data by the AD converter 17, the digital data is FFT-processed for each of the up period and the down period by the signal processing unit 18 to acquire FFT data having the value of the signal level and the phase information for every frequency of each bit signal BS in the up period and the down period. In this instance, FFT data is acquired for every each of the reception antennas 14l to 14d.

The vertical distance, the relative speed, and the horizontal distance of the target with respect to the vehicle CR are derived by use of the plurality of FFT data derived by the above manner. In the case of usually performing computation technique, such as spatial average, to derive an angle, correct angular information can be derived by computation using the plurality of FFT data.

Herein, the vertical distance of the target with respect to the vehicle CR is derived by Expression 1, and the relative speed of the target with respect to the vehicle CR is derived by Expression 2. Further, the angle of the angle with respect to the vehicle CR is derived by Expression 3. The horizontal distance of the target with respect to the vehicle Cr is derived by computation using a trigonometric function from the information about the vertical distance of the target and the angle derived by Expression 3.

[Expression 1]

$$R = \frac{(f_{up} + f_{dn}) \cdot c}{2 \times (4 \times \Delta F \times f_m)} \quad (1)$$

[Expression 2]

$$V = \frac{(f_{up} - f_{dn}) \cdot c}{2 \times (4 \times \Delta F \times f_m)} \quad (2)$$

[Expression 3]

$$\theta_m = \frac{\theta_{up} + \theta_{dn}}{2} \quad (3)$$

Returning back to FIG. 2, the LPF (Low Pass Filter) 16 is a filter capable of decreasing a component of a frequency higher than a predetermined frequency, without decreasing a component of a frequency lower than the predetermined frequency. In this instance, the LPF 16 is also installed in each reception antenna, as well as the mixer 15.

The AD converter 17 derives plural sampling data by sampling the beat signal that is an analog signal in a predetermined cycle. Further, the AD converter 16 quantizes the sampled data to convert the beat signal of the analog data into digital data, and output the digital data to the signal processing unit 18. The AD converter 17 is installed in each reception antenna, as well as the mixer 15.

The signal processing unit 18 is a computer including a CPU 181 and a memory 182, and acquires the FFT data by FFT-processing the beat signal of the digital data outputted from the AD converter 17. The signal processing unit 18 extracts a signal, of which the value of the signal level exceeds a predetermined threshold, among the bit signals of FFT data as a peak signal. The signal processing unit 18 derives target information by pairing the peak signal of the up period and the peak signal of the down period. Further, the signal processing unit 18 judges whether or not the extracted peak signal is a ghost peak corresponding to the target which does not exist actually, thereby excluding the target information corresponding to the peak signal of the ghost from an output subject of the radar apparatus.

The memory 182 is stored with an execution program, such as various computation processes executed by the CPU 181. Further, the memory 182 is stored with plural target information derived by the signal processing unit 18. For example, the memory is stored with target information (vertical distance, horizontal distance, and relative speed of target) derived in the past process and the current process. The memory 182 is stored with FFT data 182a acquired by the FFT process. The FFT data 182a is recorded with FFT data of the past target deriving process including the FFT data in the current target deriving process.

The transmission control unit 107 is connected to the signal processing unit 18, and outputs the control signal to the signal generating unit 11 for generating a modulated signal, based on the signal from the signal processing unit 18. Further, the transmission control unit 107 outputs the control signal to the conversion unit 131 connected to any one transmission antenna of the transmission antenna 13a and the transmission antenna 13b and the oscillator 12, based on the signal from the signal processing unit 18.

The vehicle control device 2 controls operations of various devices provided in the vehicle CR. That is, the vehicle control device 2 obtains information from various sensors, such as the vehicle speed sensor 40 and the steering sensor 41. The vehicle control device 2 controls the behavior of the vehicle CR by operating various devices, such as the brake 50 and the throttle 51, based on the information obtained from various sensors and the target information obtained from the signal processing unit 18 of the radar apparatus 1.

Examples of the vehicle control performed by the vehicle control device 2 are as follows. The vehicle control device 2 controls the vehicle CR to follow up the preceding vehicle which is moving in the same traffic lane as the traveling vehicle CR. Specifically, the vehicle control device 2 controls at least one of brake 50 and the throttle 51 according to the traveling of the vehicle CR to perform the control of ACC which allows the vehicle CR to follow-up drive the preceding vehicle in the state of securing a given inter-vehicular distance between the vehicle CR and the preceding vehicle.

Further, as an example of the vehicle control performed by the vehicle control device 2, the vehicle control device 2 performs the control of protecting passengers of the vehicle CR in preparation for that the vehicle CR collides with an obstacle. Specifically, in a case where there is danger that the vehicle CR collides with an obstacle, a user of the vehicle CR is given by warning indication using an alarm device (not illustrated), or PCS (Pre-crash Safety System) is controlled to reduce the speed of the vehicle CR by controlling the brake 50. Further, the vehicle control device 2 performs the PCS control by fixing the passenger to a seat by means of a seat belt or fixing a headrest to reduce damage of a passenger's body of the vehicle CR against an impact when collision occurs.

The vehicle speed sensor 40 outputs a signal according to the speed of the vehicle CR based on a rotational speed of an axle of the vehicle CR. The vehicle control device 2 takes a current speed of the vehicle based on the signal from the vehicle speed sensor 40.

The steering sensor 41 detects a steering angle of a steering wheel which is operated by a driver of the vehicle CR, and transmits the information about an angle of a vehicular body of the vehicle CR to the vehicle control device 2.

The brake 50 decelerates the speed of the vehicle CR by the operation of the driver of the vehicle CR. Further, the brake 50 decelerates the speed of the vehicle CR by the control of the vehicle control device 2. For example, the speed of the vehicle CR is decelerated to maintain the distance between the vehicle CR and the preceding vehicle at a constant distance.

The throttle 51 accelerates the speed of the vehicle CR by operation of the driver of the vehicle CR. Further, the throttle 51 accelerates the speed of the vehicle CR by the control of the vehicle control device 2. For example, the throttle 51 accelerates the speed of the vehicle Cr to maintain the distance between the vehicle CR and the preceding vehicle at a constant distance.

2. Overall Processing

Figure 4:
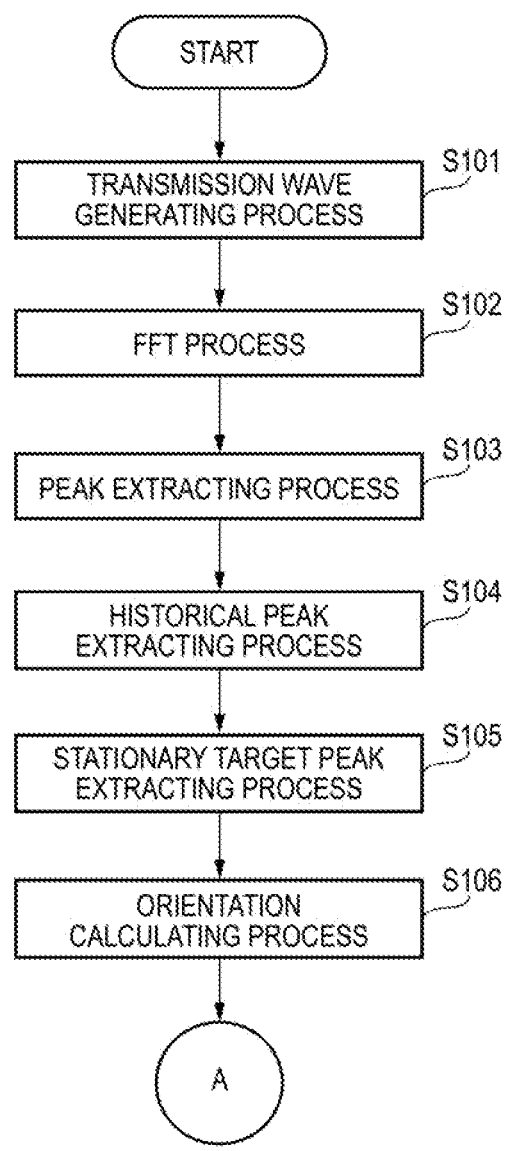
FIG. 4 is a flowchart illustrating a process of deriving target information.
Figure 5:
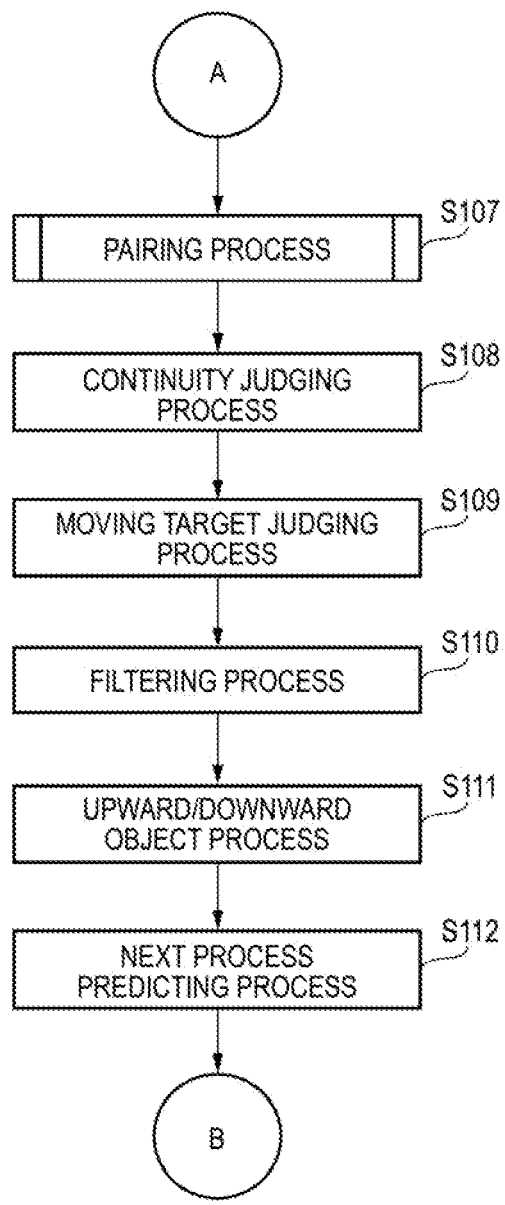
FIG. 5 is a flowchart illustrating the process of deriving the target information.
Figure 6:
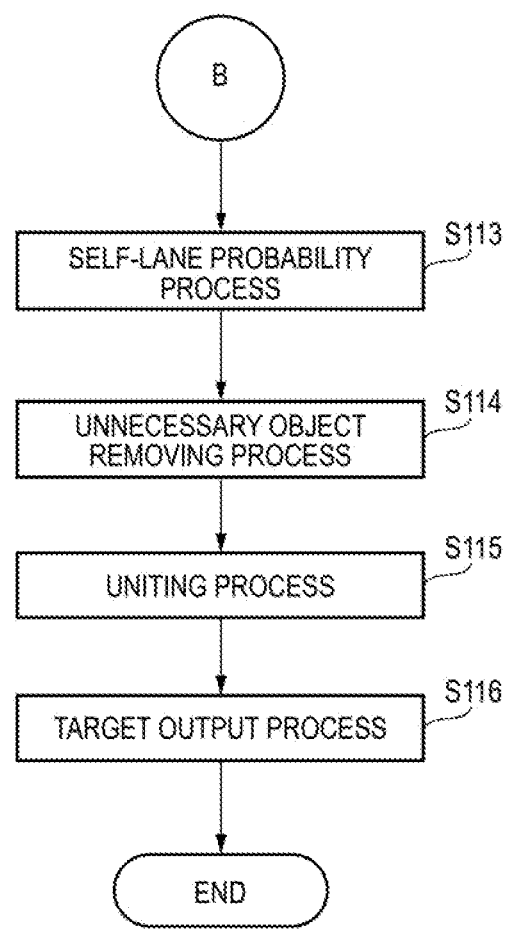
FIG. 6 is a flowchart illustrating the process of deriving the target information.

FIGS. 4 to 6 are flowcharts illustrating the process in which the signal processing unit 18 derives the target information. The signal processing unit 18 outputs an instruction signal of generating the transmission wave to the transmission control unit 107 (step S101). The signal generating unit 11 is controlled by the transmission control unit 107 to which the instruction signal is input from the signal processing unit 18, and the transmission wave corresponding to the transmitting signal TX is generated. The generated transmission wave is output to the outside of the vehicle.

The reception antenna 14 receives the reflection wave which comes from the target at which the transmission wave reflects, and the mixer 15 mixes the transmitting signal TX and the receiving signal RX corresponding to the reflection wave to generate the beat signal BS which is a difference between the transmitting signal TX and the receiving signal RX. The beat signal which is the analog signal is filtered by the LPF 16, and is converted into the digital data by the AD converter 17, and then is input to the signal processing unit 18.

The signal processing unit 18 performs the FFT processing on the beat signal of the digital data to obtain FFT data having a value of the signal level of the bit signal for every frequency (step S102).

Subsequently, the signal processing unit 18 extracts the bit signal, of which the value of the signal level exceeds the given threshold, among the bit signals of FFT data (step S103). In this instance, the peak signals are extracted from the up period and the down period which correspond to two-cycle transmission periods in this process, and thus the number of peak signals is determined.

The signal processing unit 18 performs a historical peak extracting process of extracting a peak signal having continuity with the target derived in the past target deriving process, among the peak signals extracted in the peak extracting process (step S104).

Next, the signal processing unit 18 performs a process of extracting a peak signal of each period, of which a frequency difference between the peak signal of the up period and the peak signal of the down period corresponds to the speed, from the information about the speed of the one's own vehicle obtained by the vehicle speed sensor 40 of the vehicle CR, as a peak signal corresponding to the stationary object (step S105). Herein, the stationary object means a target having the substantially same relative speed as the speed of the vehicle CR. Further, a target moving at a specific speed and having a relative speed different from the speed of the vehicle CR is hereinafter referred to as the stationary object.

In this instance, performing the process of extracting the historical peak (step S104) and the process of extracting the peak of the stationary object (step S105) is to select the peak signal corresponding to the target having the necessity which should be preferentially output to the vehicle control device 2 by the signal processing unit 18. For example, since the peak signal of the target of the current process having the temporal continuity with the target derived in the previous process has a high probability that the target actually exists in comparison to the target which is not derived in the previous process but is newly derived, the peak signal may have a high priority level. Also, since the peak signal corresponding to the moving object has the high probability that the target collides against the vehicle CR, rather than the peak signal corresponding to the stationary object, its priority may be high.

The signal processing unit 18 performs the orientation computation based on the peak signal in each period of the up period and the down period (step S106). Specifically, the signal processing unit 18 derives the orientation (angle) of the target by a given orientation calculating algorithm. For example, the orientation calculating algorithm is ESPRIT (Estimation of Signal Parameters via Rotational Invariance Techniques). A proper value and a proper vector of a correlation matrix are calculated from the phase information of the received signal in each reception antennas 14a to 14d, and an angle θup corresponding to the peak signal of the up period and an angle θdn corresponding to the peak signal of the down period are derived. Meanwhile, in the case where each peak signal of the up period and the down period is paired, the angle of the target is derived by Expression 3 described above. Further, the information about the frequency of one peak signal corresponds to the information about the distance of the target and the relative speed, but information about the plurality of targets may be included in the frequency of one peak signal. For example, in the position information of the target with respect to the vehicle CR, there is a case where the information about the plurality of targets having the same distance value and the different angle value is included in the peak signal of the same frequency. In this instance, since the phase information about the plurality of reflection waves from the different angle becomes different phase information, the signal processing unit 18 derives the plurality of target information which exists at different angle in one peak signal, based on the phase information of each reflection wave.

In the case of performing the orientation computation, the phase may be rotated at an angle of 360 degrees depending on the angle of the target, and thus angle information different from the original angle at which the target exists may be derived. For example, in a case where phase information of the reflection wave from the target received by the reception antenna is 420 degrees, even though the target exists in the region of the beam pattern BA other than the beam pattern NA illustrated in FIG. 1, the phase information is judged as an angle of 60 degrees (420 degrees to 360 degrees) by phase-aliasing, so that wrong angle information, in which there target exists in the region of the beam pattern NA not included in the beam pattern BA, may be derived. For this reason, the transmission wave of different beam pattern is respectively output from two transmission antenna of the transmission antennas 13a and 13b to derive the correct angle of the target.

Specifically, the angle is derived as follows, based on the reflection wave at the transmission wave of each beam pattern. In the case where the phase information of the reflection wave is 60 degrees, the value of the signal level of each angular spectrum corresponding to the reflection wave of the transmission wave of the transmission antenna 13a and the reflection wave of the transmission wave of the transmission antenna 13b is compared to each other, and if the value of the signal level of the angular spectrum corresponding to the reflection wave of the transmission wave of the transmission antenna 13a is high, an angle corresponding to the phase information about 60 degrees in the region of the beam pattern NA except for the region of the beam pattern BA is derived as an angle of the target. Further, the value of the signal level of the angular spectrum corresponding to the reflection wave of the transmission wave of the transmission antenna 13b is high, an angle corresponding to the phase information about 420 degrees in the region of the beam pattern BA except for the region of the beam pattern NA is derived as an angle of the target. Since the transmission wave of different beam pattern is output for each cycle from the transmission wave of 2 cycles of transmission signal TX, the target prevents derivation of the wrong angle information by the phase-aliasing in the case of the orientation computation.

Next, the signal processing unit 18 performs a pairing process of pairing the peak signal of the up period and the peak signal of the down period (step S107). In the pairing process, for the historical peak signals, which are extracted in the historical peak extracting process (step S104), the historical peak signal of the up period and the historical peak signal of the down period are paired, among the whole peak signals derived in step S103. Further, for the stationary object peak signals which are extracted in the stationary object peak extracting process (step S105), the stationary object peak signal of the up period and the stationary peak signal of the down period are paired. In addition, the remaining peak signals except for the historical peak signals and the stationary object peak signals extracted in the peak extracting process, the remaining peak signals of the up period and the remaining peak signals of the down period are paired.

In this instance, the pairing process of the peak signal of the up period and the peak signal of the down period is performed by, for example, computation using a Mahalanobis distance. Specifically, before the radar apparatus 1 is mounted to the vehicle CR, plural data, that is, normal-paired data paired in a correct combination and mis-paired data paired in a wrong combination, is acquired while experimentally pairing the peak signal of the up period and the peak signal of the down period, and an average value for every three parameters of the plurality of normal-paired data is derived from three parameter values of a difference in values of the signal levels, a difference in values of the angle, and a difference in values of the signal levels of angular spectrum, and then is stored in the memory 182 in advance.

The Mahalanobis distance is derived by Expression 4 below using the average value for every three parameters of all combinations of the peak signal of the up period and the peak signal of the down period and three parameters of the plurality of normal-paired data, among the peak signals of FFT data obtained in the current process. The signal processing unit 18 derives the paired data of the current process, in which the Mahalanobis distance is minimized, as the normal-paired data. Herein, the Mahalanobis distance is a value of one group represented by a multivariable vector x=(x1, x2, x3), for example, in which an average is μ=(μ1, μ2, μ3)T and a covariance matrix is Σ. In this instance, μ1, μ2, and μ3 represent values of three parameters of the normal-paired data, and x1, x2, and x3 represent values of three parameters of the paired data of the current process.

$$D_M(x) = \sqrt{(x-\mu)^T \Sigma^{-1} (x-\mu)}$$ [Expression 4]

The signal processing unit 18 derives the vertical distance, the relative distance, and the horizontal distance, which is based on the angle, of the paired data which is judged as the normal-paired data, using the parameter values of the normal-paired data in the pairing process and Expressions 1 to 3 above. In this instance, the detailed description of the pairing process using the historical peak signal will be given later.

Next, the signal processing unit 18 performs continuity judgment to judge whether or not a temporally consecutive relation exists between the current paired data which is paired by the current target deriving process, and the previous paired data which is paired by the previous process (step S108). The case (there is the continuity) where there is the temporally consecutive relation between both the paired data means, for example, a case where the predicted paired data predicting the current paired data is generated based on the previous paired data, and then a difference value in the vertical distance, the horizontal distance and the relative speed between the current paired data and the predicted paired data is within a predetermined value. In this instance, it is judged that the target derived by the current process and the target derived by the past process is the same target. If the plurality of current paired data exists within the predetermined value, the signal processing unit 18 may judge that the current paired data having the lowest difference value with the predicted paired data has the temporally consecutive relation with the target information of the previous process.

Further, if the difference value of the vertical distance, the horizontal distance and the relative speed between the pared data target information of the current process and the predicted paired data is not within the predetermined value, the signal processing unit 18 judges that there is no temporally consecutive relation (no continuity) between the current paired data and the previous target information. The paired data which is judged that there is no continuity becomes data (newly paired data) which is first derived in the current target deriving process. In this instance, for the newly paired data, since there is no predicted paired data in a filtering process which will be described later, the distance, the relative speed, the angle, and the value of the signal level of the newly paired data become the distance, the relative speed, and angle, and the value of the signal level of one target in the current target deriving process. Further, if it is judged that there is the continuity at predetermined consecutive times (i.e., if it is judged as the same target), the signal processing unit 18 performs a process of determining the detected target as the correct target.

The signal processing unit 18 derives paired data corresponding to the moving target from the information about the speed of the vehicle CR and the relative speed of the paired data (step S109). Since the process is performed, it is possible to derive the paired data having the necessity which should be preferentially processed.

If there is the temporally consecutive relation between the current paired data and the predicted paired data, the signal processing unit 18 performs the filtering of the vertical distance, the horizontal distance, the relative speed, and the value of the signal level between the current paired data and the predicted paired data (step S110), and derives the filtered paired data (past correspondent paired data) as the target information of the current process.

If there is the temporally consecutive relation between both paired data, for example, the signal processing unit 18 adds a value of 0.75 to the horizontal distance of the predicted paired data for the horizontal distance, and adds a value of 0.25 to the horizontal distance of the current paired data. The result obtained by adding both horizontal distances is derived as the horizontal distance of the past correspondent paired data of the current target deriving process. Further, the vertical distance, the relative speed, and the value of the signal level are also filtered Next, the signal processing unit 18 performs an upward/downward object process of deriving a stationary object which is not necessary for the control of the vehicle CR (step S111). Specifically, the signal processing unit derives the stationary object (e.g., road sign of a cantilever type or gate type installed above the road) of which a position of the vehicular height direction of the stopped vehicle CR exists at a position (e.g., higher than a vehicular height of the vehicle CR) higher than a given height. Further, the signal processing unit derives a stationary object (e.g., a traffic button such as a chatter bar attached with a reflective plate which is installed to a median strip or a curve road) existing at a relatively low position than the vehicular height of the vehicle CR. For the stationary object derived by the above manner, the target information is removed by an unwanted object removing process which will be described later, and is not output to the vehicle control device 2 from the radar apparatus 1 as the target information.

In the process (next process) next to the current process, the signal processing unit 18 derives predicted values (predicted vertical distance, predicted relative speed, predicted horizontal distance, or the like) of the next target information to be used in a historical peak extracting process (step S104) (step S112). Specifically, the signal processing unit 18 derives 20 target information having the high priority after the vehicle is controlled, and calculates the predicted values of each peak signal of the up and down periods, which will be used in the next process of deriving the historical peak. In the case of performing the ACC control, the target having the relatively short vertical distance with respect to the vehicle CR at the horizontal position corresponding to the same traffic lane as the traveling vehicle CR has the high priority, while the target having the relatively long vertical distance with respect to the vehicle CR at the horizontal position corresponding to an adjacent traffic lane has the low priority. Further, in the case of the PCS, the target having the relatively short time-to-collision (hereinafter referred to as TTC) has the high priority, while the target having the relatively long TTC has the low priority.

Subsequently, the signal processing unit 18 derives information about the curve radius of the same traffic lane as the traveling vehicle CR, and a horizontal distance according to the curve radius from the vertical distance and the horizontal distance of the target. Specifically, according to information about a rotational angle of the steering wheel input from the steering sensor 41 when a steering wheel (not illustrated) of the vehicle CR is operated by the driver of the vehicle CR, the signal processing unit derives a horizontal distance (relative horizontal distance) of the target with respect to the reference axis BL which is imaginarily changed in a straight line and a curve, and derives the probability (self-lane probability) that the target exits in the same traffic lane as the vehicle, from two-dimensional map data, of which the relative horizontal distance and the vertical distance of the target with respect to the vehicle CR are stored in the memory 182 as the parameters in advance (step S113), based on the relative horizontal distance and the vertical distance of the target with respect to the vehicle CR.

The signal processing unit 18 performs a process of removing the target which is not necessary to be output to the vehicle control device 2, with respect to the target information derived by the above processes (step S114). For example, the signal processing unit 18 removes the target information derived in the above-described upward/downward object process (step S111), and removes the target information of the ghost peak corresponding to the target, which does not actually exist, generated by interference (intermodulation) between the peak signal corresponding to the actual target existing above the predetermined distance and the switching noise of the DC-DC converter of the power supply device of the radar apparatus 1.

Next, the signal processing unit 18 performs a process of uniting plural target information as one target information corresponding to one object (step S115). For example, in the case where the transmission wave is emitted from the transmission antenna 13 of the radar apparatus 1, the reflection waves to be received by the reception antenna 14 exist in plural when the transmission wave is reflected from the preceding vehicle. That is, the reflection waves from a plurality of reflection points arrive at the reception antenna 14 for the same object. As a result, the signal processing unit 18 derives plural target information having different position information based on the respective reflection waves, but since it is originally the target information of one vehicle, the signal processing unit 18 performs the process of uniting each target information as one to be handled as the target information of the same object. For this reason, if each relative speed of plural target information is substantially equal, and the vertical distance and the horizontal distance of each target information are within a predetermined range, the signal processing unit 18 regards plural target information as the target information of the same object, and then performs the process of uniting plural target information as the target information corresponding to one target.

The signal processing unit 18 outputs the target information, which has the high priority to be output to the vehicle control device 2, to the vehicle control device 2 (step S116), from the target information united in the process (step S108).

3. Pairing Process

Figure 7:
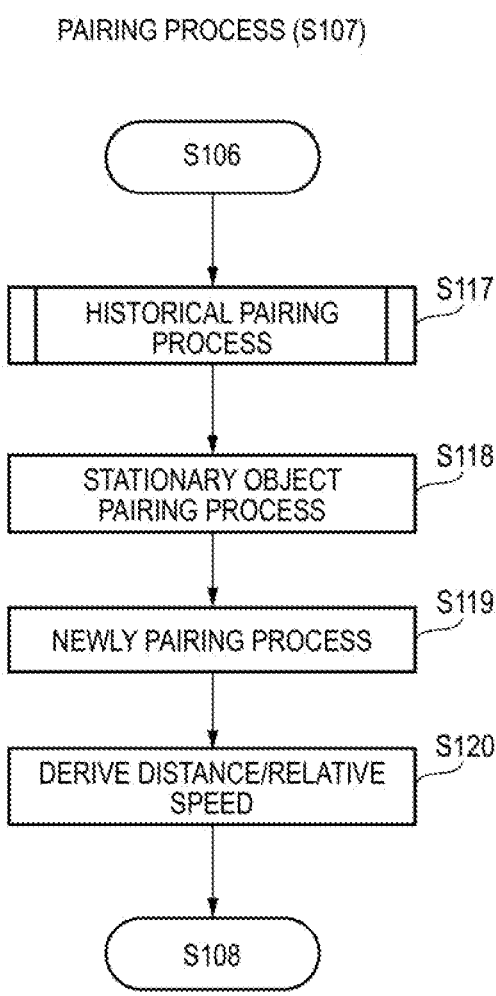
FIG. 7 is a flowchart illustrating a pairing process.

Next, the pairing process (step S107) according to this embodiment will be described in detail with reference to FIGS. 7 to 18. FIG. 7 is a flowchart illustrating the pairing process. In the pairing process according to this embodiment, the signal processing unit pairs the peak signal of the up period and the peak signal of the down period which are extracted in the peak extracting process (step S103), and derives the target information, such as a distance and a relative speed, based on the paired data obtained by the pairing process. Hereinafter, a detailed description will be given.

First, the signal processing unit 18 performs the historical pairing process (step S117), the historical pairing process is a process of pairing the historical peak signals, which are further extracted in the historical peak extracting process (step S104), among the peak signals extracted in the peak extracting process. Further, the historical pairing process is a process of deriving the pared data (predicted paired data) predicting the current paired data based on the paired data (previous paired data) derived in the past process, and derives the actual current paired data using the predicted paired data.

Specifically, the signal processing unit 18 performs a process contrary to the process of extracting the paired data by pairing the peak signals, thereby deriving each peak signal (previous peak signal) of the previous paired data. The signal processing unit 18 derives the peak signal (predicted peak signal) predicting the current peak signal, and compares the predicted peak signal with the historical peak signal to extract the historical peak signal corresponding to the predicted peak signal.

That is, the signal processing unit 18 derives the peak signal of the up period and the peak signal of the down period (the previous up peak signal and the previous down peak signal) from the previous paired data. And, the signal processing unit 18 derives a peak signal (predicted up peak signal) predicting the peak signal of the current up period from the previous up peak signal, and derives a peak signal (predicted down peak signal) predicting the peak signal of the current down period from the previous down peak signal.

The signal processing unit 18 compares the predicted up peak signal with the historical peak signal of the up period to extract the historical peak signal (historical up peak signal) corresponding to the predicted up peak signal. Further, the signal processing unit 18 compares the predicted down peak signal with the historical peak signal of the down period to extract the historical peak signal (historical down peak signal) corresponding to the predicted down peak signal. The current paired data (historical paired data) is derived by pairing the historical up peak signal and the historical down peak signal.

In this instance, the historical peak signal corresponding to the predicted peak signal is the historical peak signal existing in the predetermined frequency range, with the predicted peak signal being a base point, and also is a peak signal which becomes a candidate to be paired as the current peak signal. In this embodiment, the pairing method can be changed according to the number of the extracted historical up peak signal and the extracted historical down peak signal, as described later.

Figure 8:
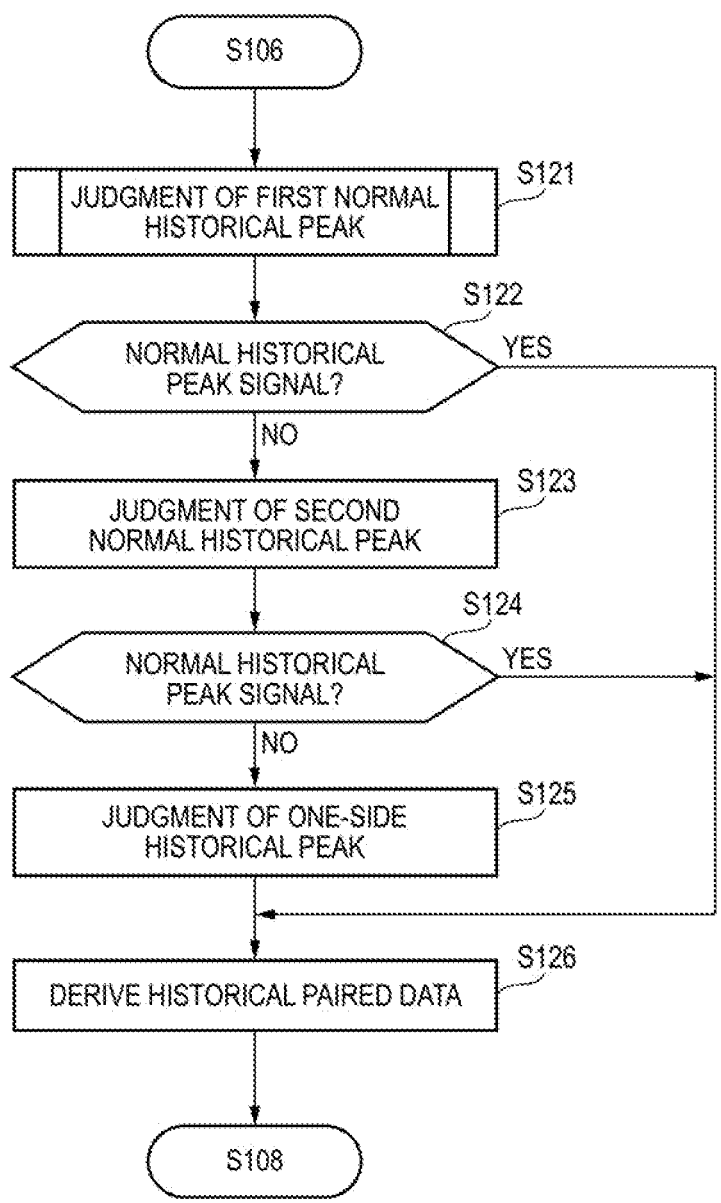
FIG. 8 is a flowchart illustrating a historical pairing process.

The historical pairing process will now be described in detail with reference to FIG. 8. FIG. 8 is a flowchart illustrating the historical pairing process. The signal processing unit 18 first performs a first normal historical peak judging process (step S121). The first normal historical park judging process is a process of extracting the historical peak signal corresponding to the predicted up peak signal and the predicted down peak signal among the historical peak signals contained in the predetermined frequency range, with the predicted peak signal being a base point.

The normal historical peak judging process will be described in detail with reference to FIG. 9. The signal processing unit 18 extracts the paired data, of which a historical flag is set to an on state, among the whole paired data derived at the previous scanning (step S127). The historical flag is a flag indicating whether the historical pairing process is executed or not, and the historical pairing process is executed in the case of the on state, in this embodiment. The historical flag is set to the on state if the paired data has the continuity. Next, the signal processing unit 18 extracts the paired data, of which a preferred self-lane preceding vehicle state flag is set to the on state, among the paired data of which the historical flag is set to the on state (step S128). First, the preferred self-lane preceding vehicle state flag is a flag which is set to the on state if the preceding vehicle is a vehicle that is closest to the subject vehicle, among the preceding vehicles traveling in the same traffic lane as the subject vehicle, and which is set to an off state in the other case.

The signal processing unit 18 derives the predicted peak signal from the previous paired data extracted (step S129). Specifically, the signal processing unit 18 performs the process of deriving the paired data by pairing each peak signal of the up period and the down period, and the reverse process to separate the previous paired data into each peak signal the up period and the down period. The signal processing unit 18 derives the predicted up peak signal (having a predicted frequency and a predicted angle) and the predicted down peak signal (having a predicted frequency and a predicted angle) using the frequency and angle information of each peak signal.

The signal processing unit 18 extracts the historical peak signal corresponding to the predicted peak signal, among the current historical peak signals within the predetermined frequency on the basis of the predicted peak signal, in each of the up period and the down period (step S130). Specifically, the signal processing unit 18 extracts the historical up peak signal existing in a range of 6 BIN (each 3 BIN at the low frequency side and the high frequency side) on the basis of the frequency of the predicted up peak signal. In this instance, one or plural historical up peak signals may exist within the range of 6 BIN, or no historical up peak signal may exist. Further, the signal processing unit 18 extracts the historical down peak signal existing in a range of 6 BIN on the basis of the frequency of the predicted down peak signal. In this instance, one or plural historical down peak signals may exist within the range of 6 BIN, or no historical down peak signal may exist. In this instance, 1 BIN is about 468 Hz.

The signal processing unit 18 extracts a historical peak signal of which a difference between the angle derived from the extracted historical peak signal and the angle (predicted angle) derived from the predicted peak signal is below 4 degrees (step S131). Specifically, the signal processing unit 18 derives the angle from the extracted historical up peak signal by the same process as the orientation computation. And, the signal processing unit 18 compares the derived angle with the predicted angle derived from the predicted up peak signal to extract the historical up peak signal of which the different in angle is within 4 degrees. In this instance, one or plural historical up peak signals of which the different in angle is within 4 degrees may exist, or no plural historical up peak signal may exist. Further, the signal processing unit 18 compares the derived angle with the predicted angle derived from the predicted down peak signal to extract the historical down peak signal of which the different in angle is within 4 degrees. In this instance, one or plural historical down peak signals of which the different in angle is within 4 degrees may exist, or no plural historical down peak signal may exist. The historical up peak signal and the historical down peaks signal which exist within the range of 6 BIN, of which the difference in angle is within 4 degrees, become a candidate to be paired, respectively.

Figure 10A:
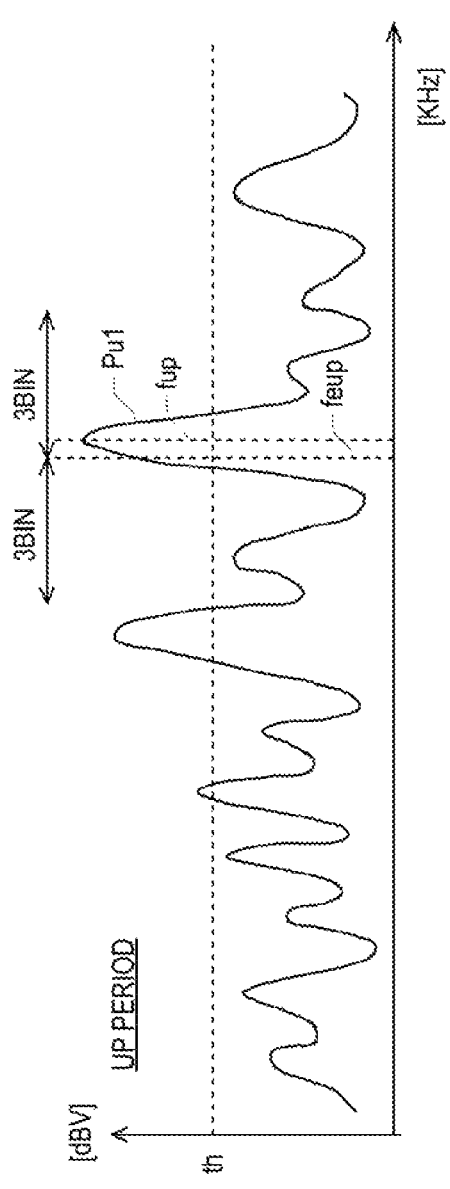
FIGS. 10A and 10B are diagrams illustrating a historical peak signal.
Figure 10B:
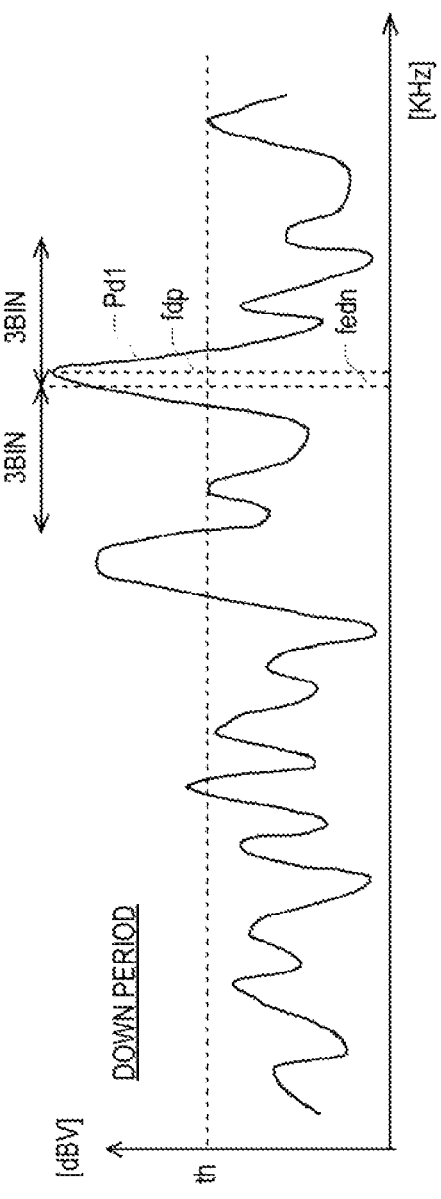

The processes of step S130 and step S131 will now be described with reference to FIGS. 10 and 11. FIG. 10 is a diagram illustrating the historical peak signal, in which FIG. 10A shows the historical peak signal of the up period, and FIG. 10B shows the historical peak signal of the down period. The signal processing unit 18 searches the historical peak signal corresponding to the predicted up peak signal within the range of 3 BIN of the high frequency side and the low frequency side, respectively, with a frequency feup of the predicted up peak signal as its center. In the case shown in FIG. 10A, one corresponding historical peak signal Pu1 exists, and the signal processing unit 18 extracts the historical peak signal Pu1 as the historical up peak signal (frequency fup). Similarly, the signal processing unit 18 searches the historical peak signal corresponding to the predicted down peak signal within the range of 3 BIN of the high frequency side and the low frequency side, respectively, with a frequency fend of the predicted down peak signal being its center. In the case shown in FIG. 10B, one corresponding historical peak signal Pd1 exists, and the signal processing unit 18 extracts the historical peak signal Pd1 as the historical down peak signal (frequency fdn).

Figure 11A:
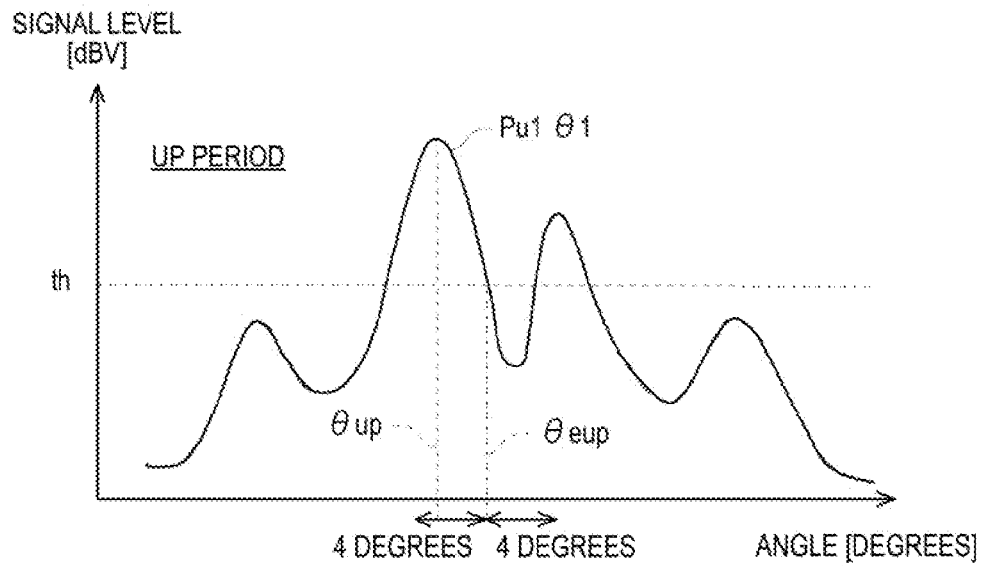
FIGS. 11A and 11B are diagrams illustrating angular spectrum.

Subsequently, the signal processing unit 18 separates and derives the angle up peak signal from the extracted historical up peak signal Pu1 by the orientation computation. FIG. 11A is angular spectrum derived from the historical up peak signal Pu1. The signal processing unit 18 judges whether or not the current angle up peak signal is within 4 degrees from the predicted angle $\theta eup$ derived from the predicted up peak signal. In the case shown in FIG. 11A, one corresponding angle up peak signal Pu1θ1 exists, and the signal processing unit 18 extracts the angle $\theta up$ of the angle up peak signal Pu1θ1 as an angle of the historical up peak signal corresponding to the predicted up peak signal. That is, the historical up peak signal corresponding to the predicted up peak signal has the information about the frequency fup and the angle $\theta up$. If the angle $\theta up$ is not within 4 degrees from the $\theta eup$, the historical up peak signal Pu1 is not extracted as the historical peak signal.

Figure 11B:
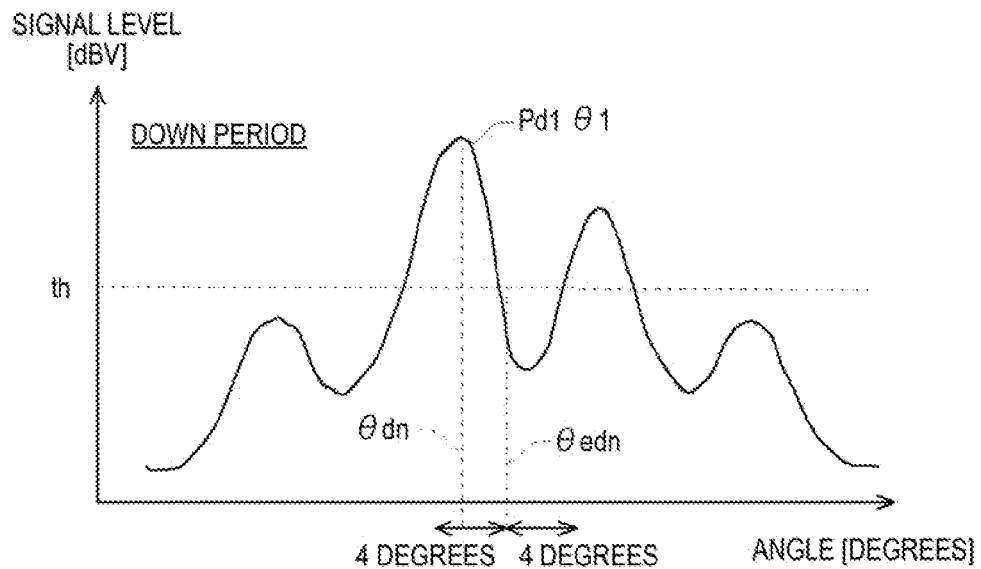

Similarly, the signal processing unit 18 separates and derives the angle down peak signal from the extracted historical down peak signal Pd1 by the orientation computation. FIG. 11B is angular spectrum derived from the historical down peak signal Pd1. The signal processing unit 18 judges whether or not the current angle down peak signal is within 4 degrees from the predicted angle $\theta edn$ derived from the predicted down peak signal. In the case shown in FIG. 11B, one corresponding angle down peak signal Pd1θ1 exists, and the signal processing unit 18 extracts the angle $\theta dn$ of the angle down peak signal Pd1θ1 as an angle of the historical down peak signal corresponding to the predicted down peak signal. That is, the historical down peak signal corresponding to the predicted down peak signal has the information about the frequency fdn and the angle $\theta dn$. If the angle $\theta dn$ is not within 4 degrees from the $\theta edn$, the historical down peak signal Pd1 is not extracted as the historical peak signal.

Figure 12A:
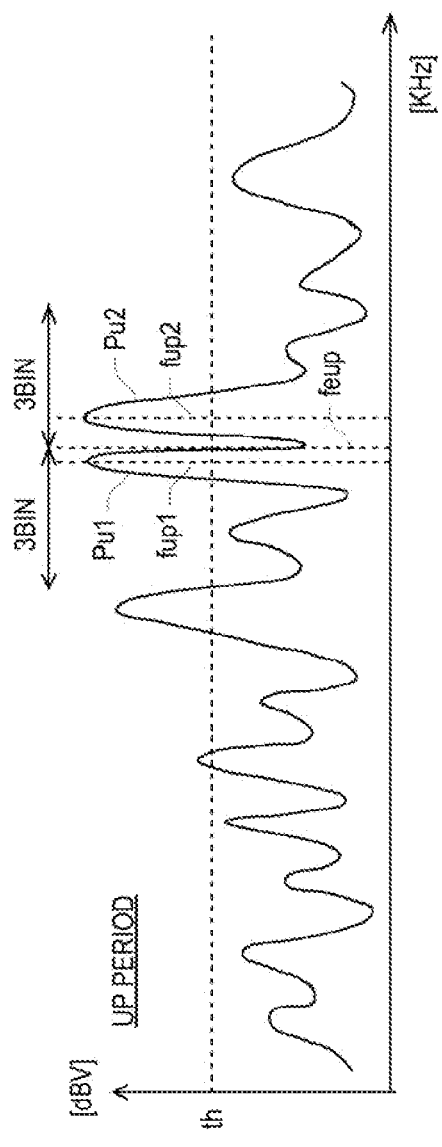
FIGS. 12A and 12B are diagrams illustrating the historical peak signal.
Figure 12B:
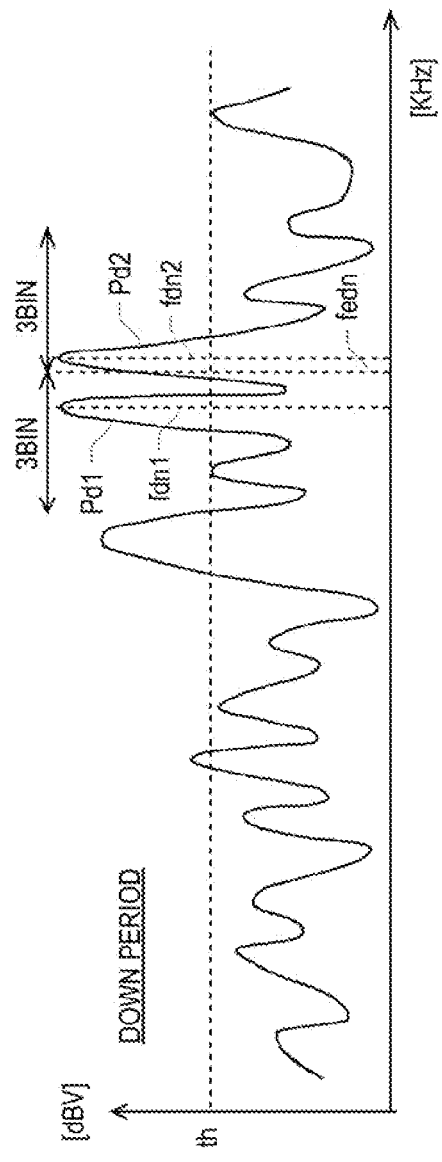

Subsequently, in the process of S130, an example in which two historical up peak signals and two historical down peak signals are respectively extracted within the predetermined range with the frequencies of the predicted up peak signal and the predicted down peak signal as its center will now be described with reference to FIG. 12. FIG. 12A shows the historical peak signal of the up period, and FIG. 12B shows the historical peak signal of the down period. The signal processing unit 18 searches the historical peak signal corresponding to the predicted up peak signal within the range of 3 BIN of the high frequency side and the low frequency side, respectively, with a frequency feup of the predicted up peak signal being as its center. In the case shown in FIG. 12A, two corresponding historical peak signals Pu1 (frequency fup1) and Pu2 (frequency fup2) exist, and the signal processing unit 18 extracts these historical peak signals as the historical up peak signals Pu1 and Pu2.

Similarly, the signal processing unit 18 searches the historical peak signal 10 corresponding to the predicted down peak signal within the range of 3 BIN of the high frequency side and the low frequency side, respectively, with a frequency fedn of the predicted down peak signal being as its center. In the case shown in FIG. 12B, two corresponding historical peak signals Pd1 (frequency Pdn1) and Pd2 (frequency Pdn2) exist, and the signal processing unit 18 extracts these historical peak signals as the historical down peak signals Pd1 and Pd2.

Although not illustrated, similar to FIG. 11, the signal processing unit 18 derives angles θup1 and θup2 from the extracted historical up peak signals Pu1 and Pu2 by the orientation computation, and derives angles θdn1 and θdn2 from the extracted historical down peak signals Pd1 and Pd2 by the orientation computation. The signal processing unit 18 judges whether or not the angles θup1 and θup2 are within 4 degrees from the predicted angle θeup derived from the predicted up peak signal. If the angles θup1 and θup2 are within 4 degrees from the predicted angle θeup, the signal processing unit extracts the historical up peak signals Pu1 and Pu2 as the historical up peak signal corresponding to the predicted up peak signal. In this instance, these historical up peak signals Pu1 and Pu2 become candidates to be paired. Similar to the down period, if the angles θdn1 and θdnp2 are within 4 degrees from the predicted angle θedn, the signal processing unit extracts the historical down peak signals Pd1 and Pd2 as the historical down peak signal corresponding to the predicted down peak signal. In this instance, these historical down peak signals Pd1 and Pd2 become candidates to be paired.

If the angle θup derived from the historical up peak signal exists in plural, the angle θup closest to the predicted angle θeup is used. The historical down peak signal is also similar.

Figure 13A:
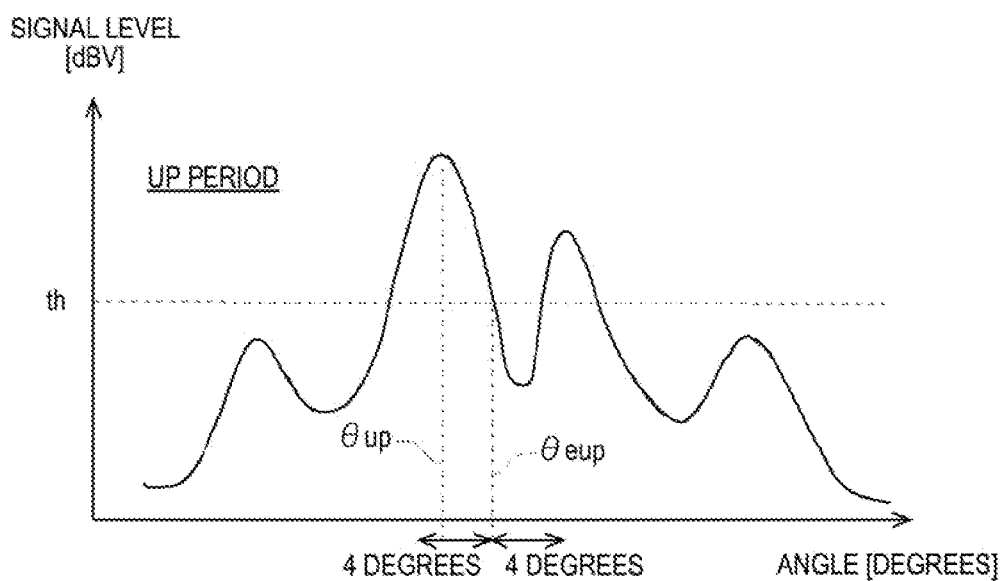
FIGS. 13A and 13B are diagrams illustrating the angular spectrum.
Figure 13B:
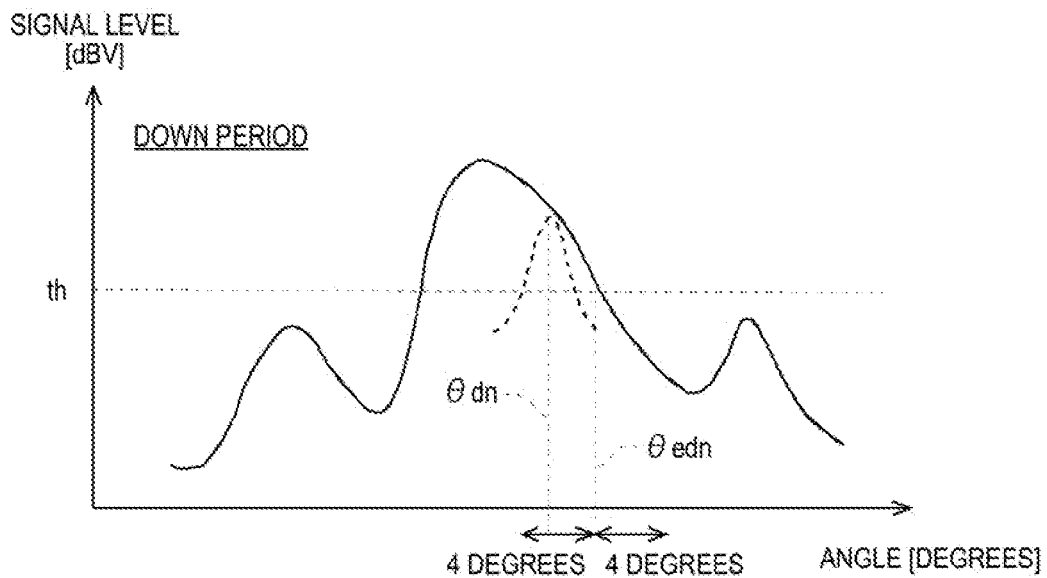

Further, an example in which any one of the historical up peak signal and the historical down peak signal cannot be contracted will now be described with reference to FIG. 13. FIG. 13 shows an example in which the historical down peak signal cannot be extracted. FIG. 13 is a diagram illustrating the angular spectrum derived from the historical up peak signal and the historical down peak signal which are extracted by the same manner as FIG. 11. In the example shown in FIG. 13, the angle θup derived from the historical up peak signal is within 4 degrees of the predicted angle θeup, so that the historical up peak signal Pu is extracted as the historical peak signal corresponding to the predicted up peak signal.

The angular spectrum derived from the historical down peak signal cannot be detected, since the angle θdn does not appear as the peak. Therefore, the historical down peak signal does not meet the condition of step S131. For example, the reason is that since an intensity of the reflection wave from a roadside object or the like existing at the same distance as the preceding vehicle is strong, the angular peak of the preceding vehicle is included in the angular peak of the roadside object or the like, so that it does not appear as the peak. In this instance, the signal processing unit 18 judges that there is no historical peak signal corresponding to the predicted down peak signal, and thus does not extract the historical down peak signal.

In the case where both angles of the historical up peak signal and the historical down peak signal are not detected as the peak and thus it does not meet the condition of step S131, both the historical up peak signal and the historical down peak signal are not extracted. In this way, one or plural historical peak signals corresponding to the predicted peak signal may be extracted, or no historical peak signal is extracted. If one or plural historical peak signals are extracted, the extracted historical peak signal becomes a candidate to be paired.

Returning back to FIG. 9, the signal processing unit 18 performs the normal historical peak judging process (step S132). The normal historical peak judging process is a process of judging whether both the historical up peak signal and the historical down peak signal exist or not. If both the historical up peak signal and the historical down peak signal exist, the process includes a process of selecting the historical peak signal to be used for the pairing.

Figure 14:
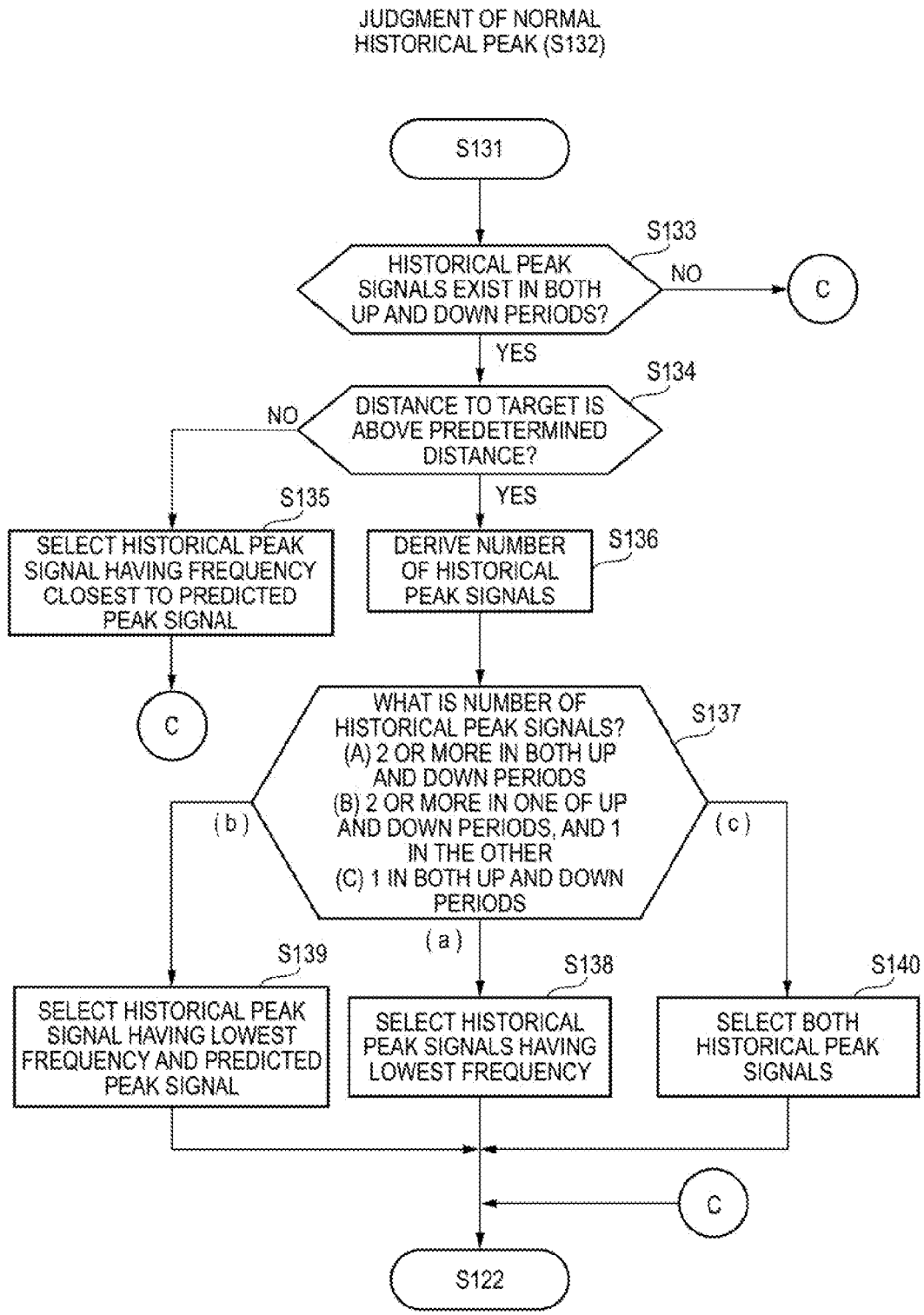
FIG. 14 is a flowchart illustrating a normal historical peak judging process.

These processes will now be described with reference to FIG. 14. FIG. 14 is a flowchart illustrating the normal historical peak judging process. As illustrated in FIG. 14, the signal processing unit 18 judges whether or not the historical up peak signal and the historical down peak signal meeting the condition of steps S130 and S131 exist, that is, the historical up peak signal and the historical down peak signal exist within a predetermined range (hereinafter referred to as "within a predicted range") on the basis of the frequency and angle of the predicted up peak signal and the predicted down peak signal (step S133). If any one or both the historical up peak signal and the historical down peak signal do not exist (i.e., if it cannot be extracted) (No in step S133), the signal processing unit judges that the normal historical peak signal does not exist. After the normal historical peak judging process is completed, it proceeds to the next process (C in FIG. 14).

If both the historical up peak signal and the historical down peak signal exist (Yes in step S133), the signal processing unit 18 judges that the normal historical peak signal exists, and it proceeds to a process of selecting the historical peak signal to be used for the pairing. Specifically, the signal processing unit 18 first judges whether or not the distance from the vehicle to the target is above a predetermined distance (step S134). If the target is close to the vehicle, a plurality of peak signals may be extracted in a frequency direction. For this reason, if the process of changing the pairing method is executed according to the number of the historical peak signals which will be described later, there is high possibility that the wrong paired data may be created. Therefore, in this embodiment, it is limited to the target which is spaced apart from the vehicle at a predetermined distance or more. The predetermined distance may be a distance capable of decreasing the possibility that the wrong paired data is created. This distance may be 14 m, for example, but other distance can be appropriately set. In this instance, as the distance to the target, the value detected by the scanning of the previous process may be used.

If the distance to the target is equal to or less than the predetermined distance (No in step S134), the signal processing unit 18 selects the historical peak signal of the frequency closest to the frequency of the predicted peak signal (step S135). That is, the signal processing unit selects the historical up peak signal of the frequency closest to the frequency of the predicted up peak signal, and selects the historical down peak signal of the frequency closest to the frequency of the predicted down peak signal. These selected historical up peak signal and historical down peak signal become the historical peak signal when the historical paired data is derived.

Meanwhile, if the distance to the target is above the predetermined distance (Yes in step S134), the signal processing unit derives the number of the historical peak signals existing within the predicted range (step S136). That is, the signal processing unit 18 derives the number of the extracted historical up peak signal, and the number of the extracted historical down signal. This is to change the peak signal used when the historical paired data is derived, according to the number of these extracted historical up peak signal and historical down peak signal.

Subsequently, the signal processing unit 18 judges whether the number of the derived historical peak signals is any one of the following (a) to (c) (step S137): (a) all the number of the historical up peak signal and the number of the historical down peak signal are 2 or more; (b) any one of the number of the historical up peak signal and the number of the historical down peak signal is 2 or more, and the other is 1; and (3) all the number of the historical up peak signal and the number of the historical down peak signal are 1.

The signal processing unit 18 changes the peak signal used when the historical paired data is derived, according to the number of the historical peak signals belonging to any one of (a) to (c) described above. Specifically, if all the number of the historical up peak signal and the number of the historical down peak signal are 2 or more ((a) in step S137), the signal processing unit 18 selects the historical peak signals having the lowest frequency (step S138). That is, the signal processing unit selects the historical up peak signal having the lowest frequency, among the historical up peak signals extracted within the predicted range, and selects the historical down peak signal having the lowest frequency, among the historical down peak signals extracted within the predicted range.

Figures 15A, 15B:
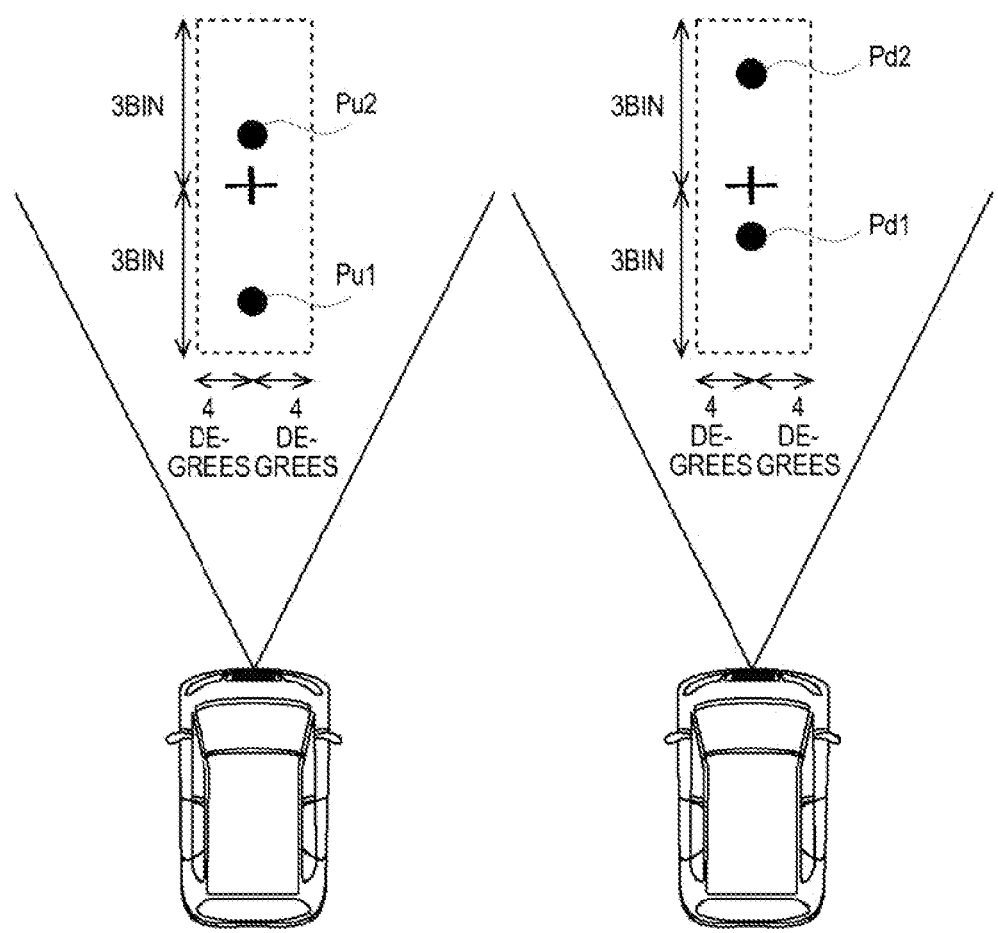
FIGS. 15A and 15B are diagrams of a vehicle when seen from a top.

The case where two historical up peak signals and two historical down peak signals are extracted will now be described with reference to FIG. 15. FIG. 15 is a diagram when seen from a top of the vehicle, in which FIG. 15A is a diagram illustrating the up period, and FIG. 15B is a diagram illustrating the down period. The symbol "+" in the drawing indicates the predicted position corresponding to the predicted peak signal, and a region enclosed by a broken line is the predicted range. As illustrated in FIG. 15, the predicted range is a range enclosed by each range of 3 BIN at the low frequency side and the high frequency side on the basis of the frequency of the predicted peak signal, and each range of 4 degrees in the left and right direction on the basis of the angle of the predicted peak signal. In this instance, the symbol "•" is the historical peak signal extracted in the current process. Pu1 and Pu2 are the historical up peak signal, and the frequency of Pu1 is lower than that of Pu2. Pd1 and Pd2 are the historical down peak signal, and the frequency of Pd1 is lower than that of Pd2. That is, in the case shown in FIG. 15, the historical up peak signals Pu1 having the low frequency and the historical down peak signals Pd1 having the low frequency are selected.

In the case where the historical up peak signal and the historical down peak signal exist in plural, it is possible to prevent the mis-pairing by selecting the historical peak signals having the low frequencies. That is, the selection of the historical peak signals having the lowest frequencies is to select the historical peak signals of the closest distance, and to select the historical peak signals created by the reflection waves from the same portion. For this reason, when the historical peak signals having the substantially approximate power exist in plural, if the historical peak signal closest to the frequency of the predicted peak signal is selected, there is possibility of selecting the historical peak signals created by the reflection waves from the portions of a different distance, but it is possible to prevent the mis-pairing.

Returning back to FIG. 14, if any one of the number of the historical up peak signal and the number of the historical down peak signal is 2 or more, and the other is 1 ((b) in step S137), the signal processing unit 18 selects the historical peak signal having the lowest frequency and the predicted peak signal (step S139). Specifically, the signal processing unit selects two or more extracted historical peak signals having the lowest frequency, and selects the predicted peak signal with respect to only one extracted side. For example, in the case where two or more historical up peak signals are extracted and one historical down peak signal is extracted, the signal processing unit 18 selects the historical up peak signal having the lowest frequency among the historical up peak signals, and the predicted down peak signal. The fact in that two or more are extracted at one side, while only one is extracted at the other side, the reliability of the one extracted historical peak signal may be low. For this reason, the extracted historical peak signal is not employed for the pairing, but the predicted peak signal is employed.

Further, if all the number of the historical up peak signal and the number of the historical down peak signal are 1 ((c) in step S137), the signal processing unit 18 selects these extracted historical up peak signal and historical down peak signal (step S140).

In the case where the normal historical peak signal exist, the pairing method is switched by changing the peak signal to be used when the historical paired data is derived, according to the number of the extracted historical up peak signal and the extracted historical down peak signal.

Returning back to FIG. 8, as the result of judging the first normal historical peak, if it is judged that the normal historical peak signal exists (Yes in step S122), the signal processing unit 18 performs the process of deriving the historical paired data (step S126). In this instance, the historical paired data is derived by pairing the selected historical peak signals (any two of the historical up peak signal, the historical down peak signal and the predicted peak signal). Meanwhile, if there is no normal historical peak signal (No in step S122), the signal processing unit 18 performs a second normal historical peak judging process (step S123).

The second normal historical peak judging process is a process of extracting the historical up peak signal and the historical down peak signal within a frequency range different from that of the first normal historical peak judging process. Even in the case where a peak does not appear at an angle at which the peak should originally exist, since the intended angle peak may appear at the historical peak signal of the different frequency, the signal processing unit performs the same process as the first normal historical peak judging process by widening the range of the frequency to be searched and narrowing the range of the angle to be searched.

As the result of judging the second normal historical peak, if it is judged that the normal historical peak signal exists (Yes in step S124), the signal processing unit 18 performs the process of deriving the historical paired data (step S126). If both the historical up peak signal and the historical down peak signal exists, the signal processing unit 18 judges that the normal historical peak signal exists. In this instance, the historical paired data is derived by pairing the extracted historical up peak signal and the extracted historical down peak signal. Meanwhile, if there is no normal historical peak signal (No in step S124), the signal processing unit 18 performs a process of judging one-side historical peak (step S125).

The one-side peak judging process is a process of searching the historical peak signal of which only one of the historical up peak signal and the historical down peak signal witch correspond to the predicted up peak signal and the predicted down peak signal is extracted, among the historical peak signals meeting the same condition as the first normal historical peak judging process.

In the above-described first normal historical peak judging process, the signal processing unit 18 judges whether both the historical up peak signal and the historical down peak signal exit or not. Accordingly, if any one does not exist, the signal processing unit does not judge that it is the normal historical peak signal, but maintains the judging result of the intent of that only one side exists. For this reason, in the one-side peak judging process, the signal processing unit 18 extracts the historical peak signal exists at only one side, from the result of the first normal historical peak judging process. If such the historical peak signal exists, the signal processing unit 18 judges that the one-side historical peak signal exists. If there is no historical peak signal, the signal processing unit 18 judges that there is no one-side historical peak signal.

The signal processing unit derives the historical paired data based on the result of each judging process (step S126). In the first normal historical peak judging process and the second normal historical peak judging process, if it is judged that the normal historical peak signal exists, since both the historical up peak signal and the historical down peak signal exist, the signal processing unit 18 derives the historical paired data by pairing these signals.

In the one-side historical peak judging process, if it is judged that one-side historical peak signal exists, since the historical peak signal exists at only one side, the signal processing unit 18 derives the historical paired data by pairing the one-side historical peak signal and the historical peak signal from which the angle information of the other side cannot be obtained. For example, in the above-described example, the signal processing unit 18 derives the historical paired data by pairing the historical peak signal in which there is the peak signal after the FFT process and from which the angle information can be derived, and the historical peak signal in which there is the peak signal after the FFT process but from which the angle information cannot be derived. In this instance, the frequency information of the historical paired data becomes the frequency of the historical up peak signal and the frequency of the historical down peak signal, and the angle information employs the angle information of the historical up peak signal from which it cannot be derived.

If the historical peak signal of one side exists, but there is no historical peak signal of the other side (i.e., there is no peak signal after the FFT process, and the angle information cannot be derived), the signal processing unit 18 derives the historical paired data by pairing the historical peak signal existing at one side, and the predicted peak signal of the other side.

Returning back to FIG. 7, after the pairing process is executed, the signal processing unit performs a stationary object pairing process (step S118). The stationary object pairing process is a pairing process which is performed with respect to the stationary object peak extracted in the stationary object peak extracting process. This process may be performed by the same method as the pairing process of step S107 described above.

Further, after the stationary object pairing process is executed, the signal processing unit performs a newly pairing process (step S119). The newly pairing process is a pairing process which is performed with respect to the peak signal, except for the historical peak signal and the stationary object peak signal, among the peak signals extracted in the peak extracting process. This process may also be performed by the same method as the pairing process of step S107 described above.

Subsequently, the signal processing unit 18 derives the distance, the relative speed, and so forth (step S120). That is, the signal processing unit 18 performs the process of deriving the vertical distance, the relative speed, and the horizontal distance based on the paired data derived in each pairing process. In the case of deriving those based on the stationary object paired data derived in the stationary object pairing process and the newly paired data derived in the newly pairing process, the process can be performed by the same manner as the case using Expressions 1 to 3.

In the case of deriving those based on the historical paired data derived in the historical pairing process, the signal processing unit performs as follows. First, the signal processing unit 18 judges whether the normal historical peak signal exists or not. If the normal historical peak signal exists, the signal processing unit derives the distance and the relative speed using the FFT peak signal of the extracted historical peak signal of each period, and simultaneously, derives the angle of the paired data using the angle information derived from the FFT peak signal of the historical peak signal of each period.

Meanwhile, if there is no normal historical peak signal, the signal processing unit 18 judges whether the one-side historical peak signal exists or not. If the one-side historical peak signal exits, the signal processing unit 18 derives the distance or the like based on the one-side historical peak signal.

If there is no one-side historical peak signal (i.e., neither of the normal historical peak signal and the one-side historical peak signal exists), the signal processing unit derives the distance, the relative speed and the angle using the predicted peak signal in both the up period and the down period.

In this embodiment, even if the plurality of peak signals are extracted within the predetermined frequency range, or even one peak signal is not extracted, the peak signal to be paired is changed according to the number of the extracted peak signals. That is, the pairing method is changed according to the number of the extracted peak signals. Therefore, it is possible to prevent the mis-pairing in the case where the plurality of peak signals are extracted.

Further, in this embodiment, even if the angle information cannot be derived from the one-side peak signal, or the FFT peak signal cannot be extracted, the signal processing unit derives the paired data not using the FFT peak signal of the predicted peak signal but using the FFT peak signal actually extracted, and thus derives the information about the distance or the like. It is possible to drive the information having the reliability higher than the case where the predicted peak signal is used, about the distance or the like.

4. Modified Examples

Hereinbefore, the embodiments of the present invention have been described. However, the present invention is not limited to those embodiments, and various modified examples may be made. Hereinafter, such modified examples will be described. On the other hand, all forms, including forms described in the above-described embodiments and forms to be described hereinafter, can be appropriately combined.

In step S137 of the above embodiment, if any one of the number of the historical up peak signals and the number of the historical down peak signals is 2 or more, and the other is 1, the signal processing unit 18 selects the historical peak signal having the lowest frequency at one side, and selects the predicted peak signal at the other side, but the present invention is not limited thereto. The following mode can be employed.

For example, the signal processing unit may select the historical peak signal of the frequency close to the frequency of the predicted peak signal. Specifically, if two or more historical up peak signals are extracted, and one historical down peak signal is extracted, the signal processing unit 18 selects the historical up peak signal having the frequency which is close to the frequency of the predicted up peak signal. Further, since only one historical down peak signal is extracted, the extracted historical down peak signal is selected. After that, the signal processing unit derives the historical paired data by using each selected peak signal through the same manner as the above description.

Further, for example, the signal processing unit may select the pair of which a degree of matching between the historical up peak signal and the historical down peak signal is high. Specifically, if two or more historical peak signals are extracted, and one historical down peak signal is extracted, the signal processing portion 18 derives the degree of matching between one of two or more historical peak signals, and the historical down peak signal, and may select the pair of the historical peak signals having the highest degree of matching. The degree of matching can be derived, for example, using a Mahalanobis distance. After that, the historical paired data is derived using each selected peak signal through the same manner as the above description.

In addition, for example, the frequencies of two or more extracted historical peak signals may be equalized. Specifically, if two or more historical peak signals are extracted, and one historical down peak signal is extracted, the signal processing portion 18 equalizes the frequency of each historical up peak signal, and derives the historical paired data using the historical up peak signal having the equalized frequency, and the extracted historical down peak signal.

Further, for example, the signal processing unit may select the historical peak having the lowest frequency, among two or more extracted historical peak signals. Specifically, if two or more historical peak signals are extracted, and one historical down peak signal is extracted, the signal processing portion 18 selects the historical up peak signal having the lowest frequency, among the historical up peak signals, and one extracted historical down peak signal, and derives the historical paired data using each historical peak signal.

In addition, for example, the signal processing unit may select the predicted peak signals in all the up period and the down period. Specifically, if two or more historical peak signals are extracted, and one historical down peak signal is extracted, the signal processing portion 18 may select the predicted peak signals in both the up period and the down period, without employing the extracted historical up peak signal and the extracted historical down peak signal, to derive the historical paired data.

In the above-described embodiment, it is described that various functions are realized by software through the arithmetic operation of the CPU according the program. However, a part of these functions may be realized by an electrical hardware circuit. By contrast, a part of the functions that are realized by the hardware circuit may be realized by software.

What is claimed is:

1. A radar apparatus capable of extracting one or more peak signals obtained from a difference frequency between a transmitting signal of which a frequency is changed in a predetermined period, and a receiving signal obtained by receiving a reflection wave of a transmission wave based on the transmitting signal at a target, during a first period in which the frequency of the transmitting signal ascends, and a second period in which the frequency of the transmitting signal descends, and deriving information about the target based on the one or more peak signals extracted by the radar apparatus, the radar apparatus comprising:
 a predicting unit configured to derive a predicted peak signal obtained by predicting a current peak signal based on a peak signal obtained in a previous process;
 an extracting unit configured to extract the one or more peak signals included within a predetermined frequency range, with the predicted peak signal being as a base point, in each of the first period and the second period; and
 a pairing unit configured to pair the one or more peak signals extracted in the first period and the one or more peak signals extracted in the second period,
 wherein the pairing unit changes a pairing method according to a number of the one or more peak signals extracted in each of the first period and the second period.

2. The radar apparatus according to claim 1, wherein the pairing unit changes the one or more peak signals to be paired according to the number of the one or more peak signals extracted in each of the first and second periods.

3. The radar apparatus according to claim 1, wherein if both the number of the one or more peak signals extracted in the first period and the number of the one or more peak signals extracted in the second period are plural, the pairing unit pairs the one or more peak signals having a lowest frequency among the one or more peak signals extracted in each of the first and second periods.

4. The radar apparatus according to claim 1, wherein if the number of the one or more peak signals extracted in one of the first and second periods is plural and the number of the one or more peak signals extracted in the other of the first and second periods is 1, the pairing unit pairs the one or more peak signals having a lowest frequency among the one or more peak signals extracted in the one of the first and second periods and the peak signal predicted in the other of the first and second periods.

5. The radar apparatus according to claim 1, wherein if both the number of the one or more peak signals extracted in the first period and the number of the one or more peak signals extracted in the second period are 1, the pairing unit pairs the one or more peak signals extracted in the first and second periods.

6. The radar apparatus according to claim 5, wherein if a distance to the target is above a predetermined distance, the pairing unit executes a process of changing the pairing method.

7. A signal processing method capable of extracting one or more peak signal obtained from a difference frequency between a transmitting signal of which a frequency is changed in a predetermined period, and a receiving signal obtained by receiving a reflection wave of a transmission wave based on the transmitting signal at a target, during a first period in which the frequency of the transmitting signal ascends, and a second period in which the frequency of the transmitting signal descends, and deriving information about the target based on the one or more peak signals extracted by the signal processing method, the signal processing method comprising:
- (a) deriving a peak signal predicting a current peak signal based on a peak signal obtained in a previous process;
- (b) extracting the one or more peak signals included within a predetermined frequency range, with the predicted peak signal being as a base point, in each of the first period and the second period; and
- (c) pairing the one or more peak signals extracted in the first period and the one or more peak signals extracted in the second period,
- wherein, in the pairing, a pairing method is changed according to a number of the one or more peak signals extracted in each of the first period and the second period.

* * * * *